(12) United States Patent
Robinson

(10) Patent No.: US 11,641,269 B2
(45) Date of Patent: May 2, 2023

(54) MODULATION-AGNOSTIC TRANSFORMATIONS USING UNITARY BRAID DIVISIONAL MULTIPLEXING (UBDM)

(71) Applicant: Rampart Communications, Inc., Annapolis, MD (US)

(72) Inventor: Matthew Brandon Robinson, Crownsville, MD (US)

(73) Assignee: Rampart Communications, Inc., Linthicum Heights, MD (US)

( * ) Notice: Subject to any disclaimer, the term of this patent is extended or adjusted under 35 U.S.C. 154(b) by 118 days.

(21) Appl. No.: 16/916,303

(22) Filed: Jun. 30, 2020

(65) Prior Publication Data

US 2021/0409193 A1    Dec. 30, 2021

(51) Int. Cl.
  *H04L 29/00*    (2006.01)
  *H04L 9/06*     (2006.01)
  *H04L 27/26*    (2006.01)

(52) U.S. Cl.
  CPC ........ *H04L 9/0637* (2013.01); *H04L 27/2627* (2013.01); *H04L 2209/80* (2013.01)

(58) Field of Classification Search
  CPC .......................... H04L 9/0637; H04L 27/2627; H04L 2209/80
  (Continued)

(56) References Cited

U.S. PATENT DOCUMENTS 5,237,587 A   8/1993   Schoolcraft
5,345,599 A   9/1994   Paulraj et al.
(Continued)

FOREIGN PATENT DOCUMENTS

CN   1813435 A     8/2006
CN   101179539 A   5/2008
(Continued)

OTHER PUBLICATIONS

International Preliminary Report on Patentability for International Application No. PCT/US2020/043686, dated Feb. 10, 2022, 16 pages.

(Continued)

*Primary Examiner* — Jeffrey C Pwu
*Assistant Examiner* — Michael D Anderson
(74) *Attorney, Agent, or Firm* — Cooley LLP

(57) ABSTRACT

A method for implementing a fast UBDM transform includes receiving a first, input vector via a processor, and partitioning the first vector to produce a magnitude vector and a sign vector. A second vector, including a modified magnitude vector and a modified sign vector, is generated by: applying a permutation to the magnitude vector to produce the modified magnitude vector, converting the sign vector, based on an algorithm, into an intermediate sign vector, and applying nonlinear layers to the intermediate sign vector. Each nonlinear layer includes a permutation, an S-box transformation, a diffusive linear operation and/or an Xor operation. Multiple linear layers are applied to the second vector to produce a third vector, the third vector being a transformed version of the first vector. A first signal representing the third vector is sent to at least one transmitter for transmission of a second signal representing the transformed data vector.

19 Claims, 6 Drawing Sheets

(58) Field of Classification Search
USPC .......................................................... 380/28
See application file for complete search history.

(56) References Cited

U.S. PATENT DOCUMENTS

| | | | |
|---|---|---|---|
| 5,555,268 A | 9/1996 | Fattouche et al. | |
| 6,389,138 B1 | 5/2002 | Li et al. | |
| 6,973,124 B2 * | 12/2005 | Miller ..................... | H04L 69/40 |
| | | | 375/222 |
| 7,330,496 B2 | 2/2008 | Ohmi et al. | |
| 7,376,173 B2 | 5/2008 | Yedidia et al. | |
| 7,454,084 B2 | 11/2008 | Faber et al. | |
| 8,320,507 B2 | 11/2012 | Higuchi | |
| 8,737,509 B2 | 5/2014 | Yu et al. | |
| 9,648,444 B2 | 5/2017 | Agee | |
| 10,020,839 B2 | 7/2018 | Robinson et al. | |
| 10,491,262 B2 | 11/2019 | Robinson et al. | |
| 10,637,705 B1 | 4/2020 | Shattil | |
| 10,735,062 B1 | 8/2020 | Robinson | |
| 10,771,128 B1 | 9/2020 | Sitaram et al. | |
| 10,819,387 B2 | 10/2020 | Robinson et al. | |
| 10,833,749 B1 | 11/2020 | Robinson | |
| 10,873,361 B2 | 12/2020 | Robinson | |
| 10,917,148 B2 | 2/2021 | Robinson | |
| 10,951,442 B2 | 3/2021 | Robinson | |
| 10,965,352 B1 | 3/2021 | Robinson | |
| 11,018,715 B2 | 5/2021 | Robinson et al. | |
| 11,025,470 B2 | 6/2021 | Robinson | |
| 11,050,604 B2 | 6/2021 | Robinson | |
| 11,075,681 B2 | 7/2021 | Robinson | |
| 11,159,220 B2 | 10/2021 | Robinson | |
| 11,258,487 B2 | 2/2022 | Robinson | |
| 11,336,341 B2 * | 5/2022 | Robinson ............ | H04L 25/0246 |
| 11,394,588 B2 | 7/2022 | Robinson | |
| 11,476,912 B2 | 10/2022 | Robinson | |
| 2002/0009209 A1 | 1/2002 | Inoue et al. | |
| 2003/0185309 A1 | 10/2003 | Pautler et al. | |
| 2003/0210750 A1 | 11/2003 | Onggosanusi et al. | |
| 2004/0059547 A1 | 3/2004 | Aftelak | |
| 2004/0105489 A1 | 6/2004 | Kim et al. | |
| 2004/0253986 A1 | 12/2004 | Hochwald et al. | |
| 2006/0109897 A1 | 5/2006 | Guo et al. | |
| 2006/0274825 A1 | 12/2006 | Ciofi et al. | |
| 2007/0091999 A1 | 4/2007 | Nissan-Cohen et al. | |
| 2007/0098063 A1 | 5/2007 | Reznic et al. | |
| 2007/0115797 A1 | 5/2007 | Reznic et al. | |
| 2007/0211786 A1 | 9/2007 | Shattil | |
| 2007/0281746 A1 | 12/2007 | Takano et al. | |
| 2008/0095262 A1 | 4/2008 | Ho et al. | |
| 2009/0046801 A1 | 2/2009 | Pan et al. | |
| 2009/0316802 A1 | 12/2009 | Tong et al. | |
| 2010/0119001 A1 | 5/2010 | Walton et al. | |
| 2010/0150266 A1 | 6/2010 | Mondal et al. | |
| 2010/0202553 A1 | 8/2010 | Kotecha et al. | |
| 2010/0246656 A1 | 9/2010 | Hammerschmidt | |
| 2010/0329393 A1 | 12/2010 | Higuchi | |
| 2011/0134902 A1 | 6/2011 | Ko et al. | |
| 2011/0235728 A1 | 9/2011 | Karabinis | |
| 2012/0093090 A1 | 4/2012 | Han et al. | |
| 2012/0236817 A1 | 9/2012 | Chen et al. | |
| 2012/0257664 A1 | 10/2012 | Yue et al. | |
| 2012/0307937 A1 | 12/2012 | Higuchi | |
| 2013/0064315 A1 | 3/2013 | Heath, Jr. et al. | |
| 2013/0100965 A1 | 4/2013 | Ohmi et al. | |
| 2013/0194961 A1 | 8/2013 | Kang et al. | |
| 2013/0223548 A1 | 8/2013 | Kang et al. | |
| 2014/0056332 A1 | 2/2014 | Soualle et al. | |
| 2015/0003500 A1 | 1/2015 | Kesling et al. | |
| 2015/0049713 A1 | 2/2015 | Lan et al. | |
| 2015/0171982 A1 | 6/2015 | Wang et al. | |
| 2015/0304130 A1 | 10/2015 | Logothetis et al. | |
| 2016/0309396 A1 | 10/2016 | Chai et al. | |
| 2016/0337156 A1 | 11/2016 | Milleth et al. | |
| 2017/0180020 A1 | 6/2017 | Namgoong et al. | |
| 2017/0237545 A1 | 8/2017 | Khandani | |
| 2017/0288902 A1 | 10/2017 | Rusek et al. | |
| 2017/0294946 A1 | 10/2017 | Wang et al. | |
| 2017/0302415 A1 | 10/2017 | Park et al. | |
| 2017/0331539 A1 | 11/2017 | Pham et al. | |
| 2018/0138939 A1 | 5/2018 | Robinson et al. | |
| 2019/0075091 A1 | 3/2019 | Shattil et al. | |
| 2019/0097694 A1 | 3/2019 | Jeon et al. | |
| 2019/0115960 A1 | 4/2019 | Jiang et al. | |
| 2019/0158206 A1 | 5/2019 | Li et al. | |
| 2019/0215222 A1 | 7/2019 | Cheng et al. | |
| 2019/0260444 A1 | 8/2019 | Hauzner et al. | |
| 2019/0268035 A1 | 8/2019 | Robinson et al. | |
| 2019/0280719 A1 | 9/2019 | Yu | |
| 2019/0349042 A1 | 11/2019 | Ramireddy et al. | |
| 2019/0349045 A1 | 11/2019 | Varatharaajan et al. | |
| 2019/0379430 A1 | 12/2019 | Pekoz et al. | |
| 2020/0007204 A1 | 1/2020 | Jeon et al. | |
| 2020/0014407 A1 | 1/2020 | Smith et al. | |
| 2020/0162123 A1 | 5/2020 | Robinson et al. | |
| 2020/0366333 A1 | 11/2020 | Robinson | |
| 2021/0006288 A1 | 1/2021 | Robinson et al. | |
| 2021/0006303 A1 | 1/2021 | Robinson | |
| 2021/0006317 A1 | 1/2021 | Robinson | |
| 2021/0006446 A1 | 1/2021 | Robinson | |
| 2021/0006451 A1 | 1/2021 | Robinson | |
| 2021/0013936 A1 | 1/2021 | Zhu et al. | |
| 2021/0036901 A1 | 2/2021 | Robinson | |
| 2021/0067211 A1 | 3/2021 | Robinson | |
| 2021/0091830 A1 | 3/2021 | Robinson | |
| 2021/0159950 A1 | 5/2021 | Robinson | |
| 2021/0184899 A1 | 6/2021 | Robinson | |
| 2021/0250075 A1 | 8/2021 | Robinson | |
| 2022/0006504 A1 | 1/2022 | Robinson | |
| 2022/0209831 A1 | 6/2022 | Robinson | |
| 2022/0353114 A1 | 11/2022 | Robinson | |

FOREIGN PATENT DOCUMENTS

| | | |
|---|---|---|
| CN | 101795257 A | 8/2010 |
| CN | 103634065 A | 3/2014 |
| CN | 103716111 A | 4/2014 |
| EP | 1826915 A1 | 8/2007 |
| EP | 1883168 A2 | 1/2008 |
| EP | 3211812 A1 | 8/2017 |
| JP | 2003198500 A | 7/2003 |
| JP | 2013162293 A | 8/2013 |
| KR | 10-2010-0131373 A | 12/2010 |
| KR | 10-2013-0118525 A | 10/2013 |
| WO | WO-2006025382 A1 | 3/2006 |
| WO | WO 2008/024773 A2 | 2/2008 |
| WO | WO 2008/098225 A2 | 8/2008 |
| WO | WO-2018089985 A1 | 5/2018 |
| WO | WO-2021003054 A1 | 1/2021 |
| WO | WO-2021003072 A1 | 1/2021 |
| WO | WO-2021003204 A1 | 1/2021 |
| WO | WO-2021021703 A1 | 2/2021 |
| WO | WO-2021046104 A1 | 3/2021 |
| WO | WO-2021061604 A1 | 4/2021 |
| WO | WO-2021162974 A1 | 8/2021 |
| WO | WO-2022173919 A1 | 8/2022 |

OTHER PUBLICATIONS

International Preliminary Report on Patentability in International Application No. PCT/US2020/039879 dated Jan. 13, 2022, 8 pages.
International Preliminary Report on Patentability in International Application No. PCT/US2020/039606 dated Jan. 13, 2022, 13 pages.
International Preliminary Report on Patentability in International Application No. PCT/US2020/040393 dated Jan. 13, 2022, 9 pages.
Korean Office Action for Korean Application No. 10-2019-7016867 dated Dec. 20, 2021, 11 pages with English translation.
Strohmer et al., "Grassmannian frames with applications to coding and communication," Appl. Comput. Harmon. Anal. (2003); 14: 257-275.
Tsiligianni et al., "Construction of Incoherent Unit Norm Tight Frames With Application to Compressed Sensing," IEEE Transac-

(56) References Cited

OTHER PUBLICATIONS tions on Information Theory, Apr. 2014, vol. 60, No. 4. pp. 2319-2330.
International Preliminary Report on Patentability for International Application No. PCT/US2020/051927, dated Apr. 7, 2022, 14 pages.
International Preliminary Report on Patentability for International Application No. PCT/US2020/049031, dated Mar. 8, 2022, 15 pages.
International Search Report and Written Opinion for PCT Application No. PCT/US2017/061489, dated Feb. 26, 2018, 8 pages.
Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.
Huang et al., "Multi-dimensional encryption scheme based on physical layer for fading channel," IET Communications, Oct. 2018, vol. 12, Issue 19, pp. 2470-2477.
Huo and Gong, "A New Efficient Physical Layer OFDM Encryption Scheme," IEEE Infocom 2014, IEEE Conference on Computer Communications, pp. 1024-1032.
International Search Report and Written Opinion for International Application No. PCT/US2020/040393, dated Sep. 3, 2020, 12 pages.
Liu et al., "Piecewise Chaotic Permutation Method for Physical Layer Security in OFDM-PON," IEEE Photonics Technology Letters, Nov. 2016, vol. 28, No. 21, pp. 2359-2362.
Ericsson, "Signature design for NoMA," 3GPP TSG-RAN WG1 Meeting #93, Tdoc R1-1806241, Busan, South Korea, May 21-25, 2018, pp. 1-5.
Huawei, "Initial Performance Evaluation of Multi-user MIMO Scheme for E-UTRA Downlink," 3GPP TSG RAN WG1, R1-051094, San Diego, USA, Oct. 10-14, 2005, 7 pages.
International Search Report and Written Opinion for International Application No. PCT/US2020/039879, dated Oct. 9, 2020, 10 pages.
International Search Report and Written Opinion for International Application No. PCT/US2020/039606, dated Nov. 25, 2020, 18 pages.
International Search Report and Written Opinion for International Application No. PCT/US2020/043686, dated Dec. 3, 2020, 24 pages.
International Search Report and Written Opinion for International Application No. PCT/US2020/051927, dated Jan. 15, 2021, 19 pages.
International Search Report and Written Opinion for International Application No. PCT/US2020/049031, dated Jan. 18, 2021, 20 pages.
International Search Report and Written Opinion for International Application No. PCT/US2021/017043, dated May 14, 2021, 12 pages.
Invitation to Pay Additional Fees for International Application No. PCT/US2020/039606 dated Sep. 21, 2020, 12 pages.
Invitation to Pay Additional Fees for International Application No. PCT/US2020/043686 dated Oct. 7, 2020, 16 pages.
Invitation to Pay Additional Fees for International Application No. PCT/US2020/049031 dated Nov. 11, 2020, 13 pages.
Ma et al., "Secure Communication in TDS-OFDM System Using Constellation Rotation and Noise Insertion," IEEE Transactions on Consumer Electronics, Aug. 2010, vol. 56, No. 3, pp. 1328-1332.
Non-Final Office Action for U.S. Appl. No. 16/459,254 dated Nov. 5, 2020, 9 pages.
Sung et al., "M-PSK Codebook Based Clustered MIMO-OFDM SDMA with Efficient Codebook Search," IEEE, 2012, 5 pages.
Tseng et al., "Hardware Implementation of the Joint Precoding Sub-System and MIMO Detection Preprocessor in IEEE 802.11n/ac WLAN," Journal of Signal Processing Systems (2019) 91:875-884.
Xie et al., "Geometric Mean Decomposition Based Hybrid Precoding for Millimeter-Wave Massive MIMO," China Communications, May 2018, vol. 15, Issue 5, pp. 229-238.
Zhang et al., "A Novel Precoder Design for MIMO Multicasting with MMSE-DFE Receivers," IEEE, 2014, 5 pages.
Zheng et al., "Performance Comparison on the Different Codebook for SU/MU MIMO," IEEE 802.16 Broadband Wireless Access Working Group, IEEE C802.16m-08/1183r1, Sep. 12, 2008, pp. 1-9.
Alian, Ehsan Haj Mirza, et al., "A phase adjustment approach for interference reduction in OFDM-based cognitive radios", IEEE Transactions on Wireless Communications (2013); 12(9): 4668-4679.
Lan, Pang-Chang, et al., "Unitary modulation for secrecy enhancement in multi-antenna wireless systems with only CSIT", 2015 IEEE International Conference on Communication Workshop (ICCW) IEEE (Jun. 8, 2015); pp. 417-422.
Chinese Office Action for Chinese Application No. 201780079040.1 dated Sep. 22, 2020, 12 pages with English translation.
European Application No. 17870211.4, Extended European Search Report dated Jun. 30, 2020; 8 pages.
European Application No. 17870211.4, Office Action dated Dec. 15, 2021; 5 pages.
European Application No. 20740468.2, Office Action dated Nov. 30, 2022; 12 pages.
European Application No. EP20743505.8, Office Action dated Dec. 7, 2022; 7 pages.
International Preliminary Report on Patentability for PCT Application No. PCT/US2017/061489, dated May 14, 2019, 6 pages.
Japanese Office Action for Japanese Application No. 2019-546787 dated Aug. 12, 2022; 4 pages with Translation.
Japanese Office Action for Japanese Application No. 2019-546787 dated Mar. 31, 2022; 5 pages with Translation.
Japanese Office Action for Japanese Application No. 2019-546787 dated Nov. 9, 2021, 19 pages with Translation.
U.S. Appl. No. 15/351,428: Ex Parte Quayle Action, dated Jan. 11, 2018; 6 pages.
U.S. Appl. No. 16/403,757: Ex Parte Quayle Action, dated Jul. 11, 2019; 6 pages.
U.S. Appl. No. 16/416,144: Office Action, dated Dec. 27, 2019; 14 pages.
U.S. Appl. No. 16/416,144: Office Action, dated May 5, 2020; 14 pages.
U.S. Appl. No. 16/459,245: Office Action, dated Jan. 3, 2020; 8 pages.
U.S. Appl. No. 16/459,245: Office Action, dated Jun. 12, 2020; 8 pages.
U.S. Appl. No. 16/527,240: Office Action, dated Jun. 22, 2020; 11 pages.
U.S. Appl. No. 16/527,240: Requirement for Restriction/Election, dated Apr. 16, 2020; 6 pages.
U.S. Appl. No. 16/560,447: Ex Parte Quayle Action, dated Mar. 20, 2020; 5 pages.
U.S. Appl. No. 16/580,722: Office Action, dated Apr. 22, 2020; 11 pages.
U.S. Appl. No. 16/690,769: Office Action, dated Mar. 3, 2020; 9 pages.
U.S. Appl. No. 17/027,144: Office Action, dated Oct. 15, 2020; 9 pages.
U.S. Appl. No. 17/142,702: Office Action, dated Oct. 28, 2021; 11 pages.
U.S. Appl. No. 17/161,118: Office Action, dated Nov. 10, 2021; 37 pages.
International Preliminary Report on Patentability for International Application No. PCT/US2021/017043, dated Aug. 25, 2022, 9 pages.
Office Action for European Application No. EP20742591 dated Dec. 22, 2022, 5 pages.
Non Final Office Action for U.S. Appl. No. 17/695,703, dated Jan. 19, 2023, 16 pages.
Notice of Allowance for U.S. Appl. No. 17/953,276, dated Feb. 16, 2023, 9 pages.
Office Action dated Mar. 17, 2023 for European Patent Application No. 20803304.3, 13 pages.

* cited by examiner

MODULATION-AGNOSTIC TRANSFORMATIONS USING UNITARY BRAID DIVISIONAL MULTIPLEXING (UBDM)

STATEMENT REGARDING FEDERAL GOVERNMENT INTEREST

This United States Government holds a nonexclusive, irrevocable, royalty-free license in the invention with power to grant licenses for all United States Government purposes.

CROSS-REFERENCE TO RELATED APPLICATIONS

This application is related to U.S. Non-Provisional patent application Ser. No. 16/416,144, filed on May 17, 2019 and titled "COMMUNICATION SYSTEM AND METHODS USING MULTIPLE-IN-MULTIPLE-OUT (MIMO) ANTENNAS WITHIN UNITARY BRAID DIVISIONAL MULTIPLEXING (UBDM)"; and to U.S. Non-Provisional patent application Ser. No. 16/459,245, filed on Jul. 1, 2019 and titled "SYSTEMS, METHODS AND APPARATUS FOR SECURE AND EFFICIENT WIRELESS COMMUNICATION OF SIGNALS USING A GENERALIZED APPROACH WITHIN UNITARY BRAID DIVISION MULTIPLEXING"; and to U.S. Non-Provisional patent application Ser. No. 16/459,262, filed on Jul. 1, 2019 and titled "COMMUNICATION SYSTEM AND METHOD USING LAYERED CONSTRUCTION OF ARBITRARY UNITARY MATRICES," the disclosures of each of which are herein incorporated by reference in their entireties for all purposes.

TECHNICAL FIELD

The present invention relates generally to data communication, and more specifically to techniques for enhancing security of data communications using unitary braid divisional multiplexing (UBDM).

BACKGROUND

Wireless communication systems are widely deployed to provide various types of communication services such as voice, packet data, and so on. These systems may utilize a modulation technique capable of providing high performance for some wireless environments, for example by partitioning the overall system bandwidth into a number of subbands (e.g., (Ns) orthogonal subbands), which are also commonly referred to as subcarriers, tones, bins, and frequency subchannels. In multiple access communications, multiple user devices transmit signals over a single communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital to analog converter, and then translated up to the carrier frequency for transmission. When different user devices send symbols at the same time over the communications channel, the sine waves represented by those symbols are superimposed to form a combined signal that is received at the receiver.

SUMMARY

In some embodiments, a method for implementing a fast UBDM transform includes receiving a first vector (an input vector) via a processor, and partitioning the first vector to produce a magnitude vector and a sign vector. A second vector, including a modified magnitude vector and a modified sign vector, is generated by: applying a permutation to the magnitude vector to produce the modified magnitude vector, converting the sign vector, based on an algorithm, into an intermediate sign vector, and applying a plurality of nonlinear layers to the intermediate sign vector, to produce the modified sign vector. The converting the sign vector is optionally based on an initialization vector. Each nonlinear layer from the plurality of nonlinear layers includes at least one of, or any combination of, a permutation, an S-box transformation, a diffusive linear operation, or an Xor operation. A plurality of linear layers is applied to the second vector to produce a third vector, the third vector being a transformed version of the first vector. A first signal representing the third vector is sent to at least one transmitter for transmission of a second signal representing the transformed data vector from the at least one transmitter to at least one receiver. In some implementations, the permutation applied to the magnitude vector does not reduce a total power of the first vector.

In some embodiments, a method for implementing a fast UBDM transform includes receiving, via a processor, an input vector including a plurality of complex numbers. A transformed vector is generated, based on the input vector and via the processor, by: applying a permutation to a magnitude vector associated with the input vector, to produce a modified magnitude vector, applying an algorithm (e.g., including an Xor operation) and a plurality of nonlinear layers to a sign vector associated with the input vector, to produce a modified sign vector, the modified magnitude vector and the modified sign vector defining an intermediate vector, and applying a plurality of linear layers to the intermediate vector to produce the transformed vector. The method also includes sending a signal representing the transformed vector to at least one transmitter for transmission of a second signal representing the transformed vector from the at least one transmitter to at least one receiver. In some implementations, the permutation applied to the magnitude vector does not reduce a total power of the first, input vector.

DETAILED DESCRIPTION

Figure 1:
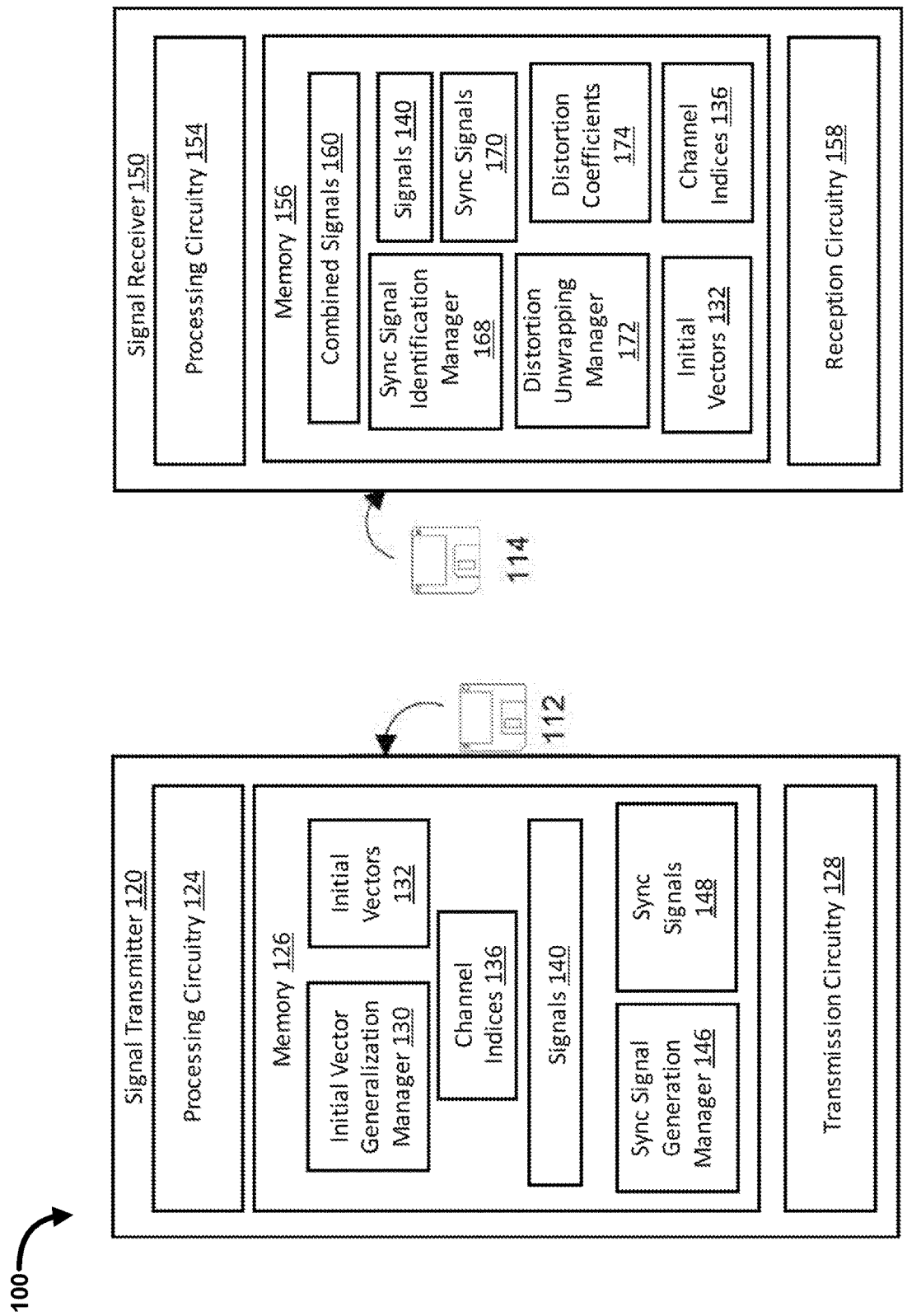
FIG. 1 is a block diagram illustrating an example electronic communications system within an electronic environment in which improved techniques described herein may be performed.

When linear transformations are applied to data as part of an encoding (e.g., "pre-coding") or modulation process prior to transmission via a network, the transmitted data can be susceptible to deciphering by eavesdroppers who may be able to determine the linear transformations based on a small number of "plain/cipher" sets (e.g., pairs) and using, for example, a single matrix inversion. As such, systems and methods employing linear transformations can be improved by the non-linearization of pre-transmission data. Although known mechanisms exist for applying nonlinear operations on complex numbers in general, and notwithstanding the data security risks associated with linear transformations, the application of such mechanisms in the context of data modulation is not believed to have previously been successfully performed, for example because of the various constraints and considerations commonly associated with data modulation. For example, during modulation, the power of the signal being transmitted can be reduced, and noise and distortion can be amplified. Non-unitary and non-linear operations can amplify and distort signals, thereby increasing the Bit Error Rate (BER). Non-linear transformations are typically not isometric, and therefore also amplify noise and increase BER to undesirable levels. By contrast, unitary transformations preserve signal power and are isomorphic/isometric, and thus are used ubiquitously in signals without taking into account security considerations. Some known cryptologics include a non-linear component that can block a linear attack by an eavesdropper. Because such cryptologics operate on bits (i.e., bit-level security) rather than on symbols, however, noise is not of concern.

Techniques are provided herein for modifying complex baseband symbols in a non-linear manner, to enhance security of orthogonal frequency-division multiplexing (OFDM) systems. In some embodiments, a method of encoding data includes identifying multiple complex number sets (e.g., pairs) of an input data vector and generating a transformed data vector by applying a non-linear transformation to each complex number set from the multiple complex number sets. The non-linear transformation includes modifying a phase of a first complex number from each complex number set. The phase modification is based on a value associated with a second complex number from each complex number set. A signal representing the transformed data vector is sent to multiple transmitters for transmission of a signal representing the transformed data vector from the multiple transmitters to multiple receivers. A signal representing the non-linear transformation is sent to a second compute device for transmission of the non-linear transformation to the multiple receivers prior to transmission of the signal representing the transformed data vector from the multiple transmitters to the multiple receivers, for recovery of the data vector at the multiple receivers.

As used herein, a "transmitter" (or "signal transmitter") refers to any collection of components that are used in the transmission of signals, including any combination of, but limited to, one or more: antennas, amplifiers, cables, digital-to-analog converters, filters, up-converters, processors (e.g., for reading bits and/or mapping of bits to a baseband), etc. Similarly, as used herein, a "receiver" (or "signal receiver") refers to any collection of components that are used in receiving signals, including any combination of, but limited to, one or more: antennas, amplifiers, cables, analog-to-digital converters, filters, down-converters, processors, etc.

Some embodiments of the present disclosure include systems and methods that achieve non-linearization of pre-transmission data symbols as part of the modulation process, for establishing data privacy at the physical layer without amplifying noise. Non-linear transformations (or "transforms") set forth herein include non-linear transformations that do not amplify noise, or that introduce a minimal amount of amplification to noise. The non-linear transformation can be applied to input data (e.g., data vectors or symbols derived therefrom) once or several times, optionally interleaved with other transformations (linear or otherwise) any number of times.

FIG. 1 is a diagram that illustrates an example system 100 in which improved techniques of transmitting wireless communications are performed. The system 100 includes a signal transmitter 120 and a signal receiver 150. It should be appreciated, however, that there may be other signal transmitters not pictured within the environment.

The signal transmitter 120 is configured to prepare signals for transmission to the signal receiver 150 and to transmit the prepared signals to the signal receiver 150. The signal transmitter 120 includes processing circuitry units 124, memory 126, and transmission circuitry unit 128. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein. The transmission circuitry 128 is configured to transmit signals in the form of radio-frequency energy to the receiver.

In some embodiments, one or more of the components of the signal transmitter 120 can be, or can include, processors (e.g., processing units 124) configured to process instructions stored in the memory 126. Examples of such instructions as depicted in FIG. 1 include an initial vector generation manager 130 and a sync signal generation manager 146. Further, as illustrated in FIG. 1, the memory 126 is configured to store various data, including initial vectors 132, channel indices 136, signals 140, and sync signals 148.

Fast Unitary Transformations

Methods and systems described above usually involve a matrix operation on a vector. If the length of the vector is N and the size of the matrix is N×N (e.g., when the matrix is a unitary matrix), then the matrix operation on the vector involves $O(N^2)$ multiplications. Accordingly, as N increases, the computational burden on the telecommunication system can be prohibitive.

In some embodiments, some fast unitary transformations can be employed to reduce the calculation complexity. For example, the matrix operation on the vector can be achieved using Fourier matrix, Walsh-Hadamard matrix, Haar matrix, Slant matrix, certain types of Toeplitz matrix, and certain types of circulant matrices that can be operated on a vector in a fast complexity class. These types of matrices, however, only form a limited class of transformations and therefore the resulting level of security may not be satisfactory.

To address the complexity issues while maintaining the security of the communication, systems and methods described herein employ an approach to build an arbitrary unitary matrix up from smaller matrices. In this approach, unitary matrices are built up in layers. Each layer includes two operations. The first operation is a permutation and the second operation is a direct sum of U(2) matrices. Permutation matrices are unitary matrices that do not require any floating point operations and therefore are computationally free, i.e., with O(1) complexity. U(2) matrices are matrices where most of the values are 0, except the 2×2 blocks along the diagonal (also referred to as block-U(2) matrices). These block-U(2) matrices involve only 4×N/2=2×N multiplications. As a result, a layer including a block-U(2) involves 2×N multiplications for the block-U(2) and no multiplications for the permutation. In other words, one layer during construction of a unitary matrix has complexity O(N).

The total complexity of constructing a unitary matrix is the product of the number of layers and O(N) that is the complexity of each layer. In some embodiments, the total number of layers can be log(N), and the total complexity of all of the layers is therefore O(N×log(N)), which is equivalent to the complexity of a standard OFDM. In addition, log(N) layers of block-U(2) and permutation matrices can produce a dense unitary. While the space of fast unitary matrices is not as large as the full space of unitary matrices, it can still be sufficiently large to make an attack by an eavesdropper prohibitive (see more details below with reference to FIG. 9).

In some embodiments, the approach described herein can employ block-U(m) matrices to build unitary matrices, where m is a positive integer (e.g., m=3, 4, 5, etc.). In some embodiments, matrices having different sizes can also be used within a single layer when constructing a unitary matrix. In some embodiments, different layers can use matrices having different sizes, e.g., a first layer uses block-U(m) matrices and a second layer uses block-U(l) matrices, where m is different from l. For example, if N=8, a set of four 2×2 block-U(2) matrices can be used in the first layer, followed by a permutation. Then two U(3) matrices and a single U(2) matrix can be used in the second layer, followed by another permutation. The third layer can include a block-U(2) matrix, a block-U(4) matrix, and then another block-U(2) matrix, followed by a third permutation.

In some embodiments, certain types of fast unitary matrices can also be written in terms of layers, each of which includes a permutation and a direct sum of blocks of smaller matrices. These types of matrices include, for example, Fourier matrices, Walsh-Hadamard matrices, Haar matrices, Slant matrices, and Toeplitz matrices. In some embodiments, the unitary matrix that can be constructed using the layered approach includes any matrix that is not a direct sum of discrete Fourier matrices.

Security Issues with Linear Transformations in Modulation

To illustrate the security vulnerabilities associated with data modulation using linear transformations, suppose that Alice and Bob are only applying a linear unitary matrix A to a data symbol $\bar{b}$ to get $\bar{s}=A\bar{b}$ at the transmitter, and then applying $A^\dagger$ (i.e., the inverse of matrix A) to $\bar{s}$ at the receiver to get $A^\dagger \bar{s}=A^\dagger A\bar{b}=\bar{b}$. In this case, suppose that Eve is able to collect a set of N linearly independent values of $\bar{s}$, denoted $\bar{s}_1, \bar{s}_2, \ldots, \bar{s}_N$. If Eve knows the corresponding untransformed bauds $\bar{b}_1, \ldots, \bar{b}_N$, she can arrange the untransformed bauds into a matrix $B=(\bar{b}_1, \ldots, \bar{b}_N)$, and the transformed bauds into the corresponding matrix $S=(\bar{s}_1, \ldots, \bar{s}_N)$. The equation linking B and S is then $$S=AB \qquad (18)$$

As such, and because the bauds are assumed to be linearly independent and A is assumed to be unitary, S will be full rank (i.e., all rows and columns are linearly independent), and Eve can readily invert it, getting $$A=BS^{-t} \qquad (19)$$

This gives Eve the entire matrix A, and as such, the security of the data transmission has been breached.

Non-Linear Transformations in Modulation

The foregoing example illustrates the security vulnerability that can exist when a linear transformation used for data modulation. The following sections describe embodiments for non-linearizing transformations during data modulation to improve security of data transmissions while avoiding drawbacks that are typically associated with non-linear operations. For example, as discussed above, non-linear transformations can amplify and/or distort a signal, thereby amplifying the noise, decreasing signal-to-noise ratio (SNR), and/or increasing the Bit Error Rate (BER). Some embodiments set forth herein accomplish a disruption of the linearity (i.e., a non-linearization) without amplifying (or minimally amplifying) the noise, in a way that may allow the system designer to tune the degree of non-linearity. Non-linear transformations described herein may not increase the total power of the signal, and are invertible, and thus permit data recovery at a receiver. The non-linear transformations can be applied to input data (e.g., data vectors or symbols derived therefrom) once or several times, optionally interleaved with other transformations (linear or otherwise) any number of times, prior to transmission of the transformed. For example, there may be 5 layers of a "block U(2)" matrix with a non-linear transformation (as set forth herein) and a permutation.

Figure 2:
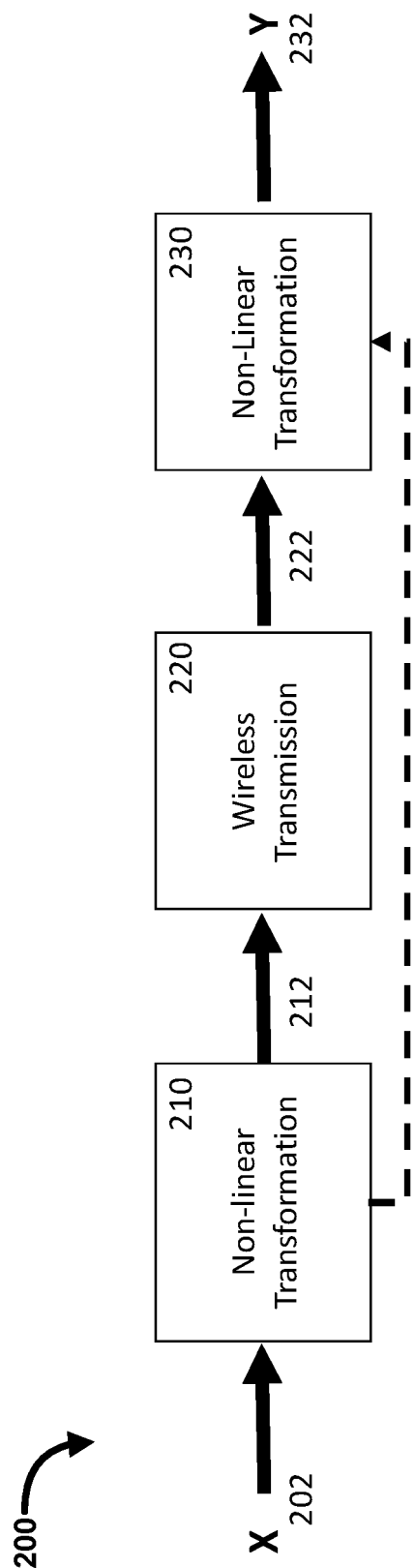
FIG. 2 is a block diagram illustrating a process flow for encoding and decoding a signal, according to an embodiment.

FIG. 2 is a block diagram illustrating a process flow for encoding and decoding a signal using a non-linear transformation, according to an embodiment. During the encoding and decoding process 200, an input data vector "X" is input at 202 to a compute device. A non-linear transformation (which is, optionally, a norm-preserving transformation) is applied via the compute device at 210 to the input data vector X to produce a transformed vector. The transformed vector is sent, at 212, to one or more transmitters for wireless transmission 220. One or more signals representing the transformed vector is sent to one more receivers at 222, and once received at the one or more receivers, the transformed vector is decoded/demodulated at 230 based on the non-linear transformation to reconstruct the input data vector at 232 (output "Y"). As indicated by the dashed line in FIG. 2, a representation of the non-linear transformation may have been transmitted from the compute device to the one or more receivers (e.g., prior to, concurrently with, in parallel with, overlapping in time with, or after transmission of the one or more signals representing the transformed vector is sent to one more receivers at 222).

In some embodiments, the non-linear transformation includes applying a first non-linear transformation and a second non-linear transformation prior to sending the signal representing the transformed data vector to the plurality of transmitters. The first and second non-linear transformations can be applied to a common collection or subset of complex number sets, or each can be applied to a different collection or subset of complex number sets. For an example of the latter case, suppose an input data vector has a length of 4, and includes components (i.e., complex numbers) 1, 2, 3, and 4. Now suppose that prior to the first non-linear transformation, components 1 and 2 are paired as one set, and components 3 and 4 are paired as another set. The first non-linear transformation is then applied to the (1,2) set and to the (3,4) set, for example in parallel or overlapping in time. Next, another collection of sets is identified, in which components 1 and 3 are paired as a first set, and components 2 and 4 are paired for the second set. The second non-linear transformation is then applied to the (1,3) set and to the (2,4) set, for example in parallel or overlapping in time. Note that, in some embodiments, although the first non-linear transformation can be applied to the (1,2) set and to the (3,4) set in parallel and the second non-linear transformation can be applied to the (1,3) set and to the (2,4) set in parallel, the first and second non-linear transformations are not performed in parallel, since the input to the second non-linear transformation is the output from the first nonlinear transformation.

Example Nonlinear Operations

In some embodiments, a nonlinear operation Q is applied q times in the first part of a fast transform. Each $Q_i$ has a length N vector associated with it, denoted $\overline{w}_i$, and there is a total of q such vectors. The values in $\overline{w}_i$ can be referred to as "activators" for the full nonlinear transform Q. Each component of $\overline{w}_i$ is a 2-bit value. As such, in all, there are 2N bits in each $\overline{w}_i$.

The action of $Q_i$ (which depends on $\overline{w}_i$) is pairwise, on adjacent values of $\overline{b}$ (i.e., components 1 and 2, then components 3 and 4, etc.). The action can be illustrated with reference to a single 2 component block. Q can include a modification of the second component of each doublet of the vector if and only if some condition on the values of $\overline{w}_i$ and $b_1$ are met, in a way that depends on what those values are. The following is example pseudo-code for the action of Q on a single doublet. The input is the two vector components $b_1$ and $b_2$ (which reside in the constellation C) and the two 2-bit values $w_1$ (with bits $w_{11}$ and $w_{12}$) and $w_2$ (with bits $w_{21}$ and $w_{22}$).

```
if w11 == 0 then
   if (-1)^w12 == Sign (Re(b1)) then
      if (w21, w22) == (0, 0) || (w21, w22) == (1, 1) then
         b2 ← -b2
      end if
      if (w21, w22) == (0, 1) then
         b2 ←, b2*
      end if
      if (w21, w22) == (1, 0) then
         b2 ← -b2*
      end if
   end if
end if
if w11 == 1 then
   if (-1)^w12 == Sign (Im(b1)) then
      if ((w21, w22) == (0, 0) || (w21, w22) == (1, 1)) then
         b2 ← -b2
      end if
      if (w21, w22) == (0, 1) then
         b2 ← b2*;
      end if
      if (w21, w22) == (1, 0) then
         b2 ← -b2*
      end if
   end if
end if
```

The function Sign(x) is a function that returns +1 when x>0 and −1 when x<0. As an example, consider a case in which $w_1$ and $w_2$ are (1; 0) and (1; 1), respectively, and $b_1=1+i$ and $b_2=-1+i$. Since $w_{11}=1$, the imaginary part of $b_1$ is considered. The sign of the imaginary part of $b_1$ is Sign $(Im(b_1))=Sign(Im(1+i))=Sign(+1)=+1$. The value $(-1)^{w12}=(-1)^0=+1$. As such, it is the case that $(-1)^{w12}==Sign(Im(b_1))$. Because $w_2=(1, 1)$, $b_2 \leftarrow -b_2$ and the action of Q on this doublet is:

$$\begin{pmatrix} 1+i \\ -1+i \end{pmatrix} \rightarrow \begin{pmatrix} 1+i \\ 1-i \end{pmatrix} \quad (0.1.1)$$

Note that the first (top) component is unchanged. The foregoing is performed for each doublet of the vector, and such operations collectively constitute a single application of Q. The permutations are included so that different components act as "control gates" for other components at each of the q layers. Note that the action of Q is unitary, though highly nonlinear.

In some embodiments, generating the transformed data vector also includes performing a linear transformation or a discrete Fourier transform after applying the non-linear transformation. Alternatively or in addition, the one or more receivers that receive the one or more signals representing the transformed vector includes a plurality of antenna arrays, and the receiver(s) and the transmitter(s) can be configured to perform Multiple Input Multiple Output (MIMO) operations.

Figure 3:
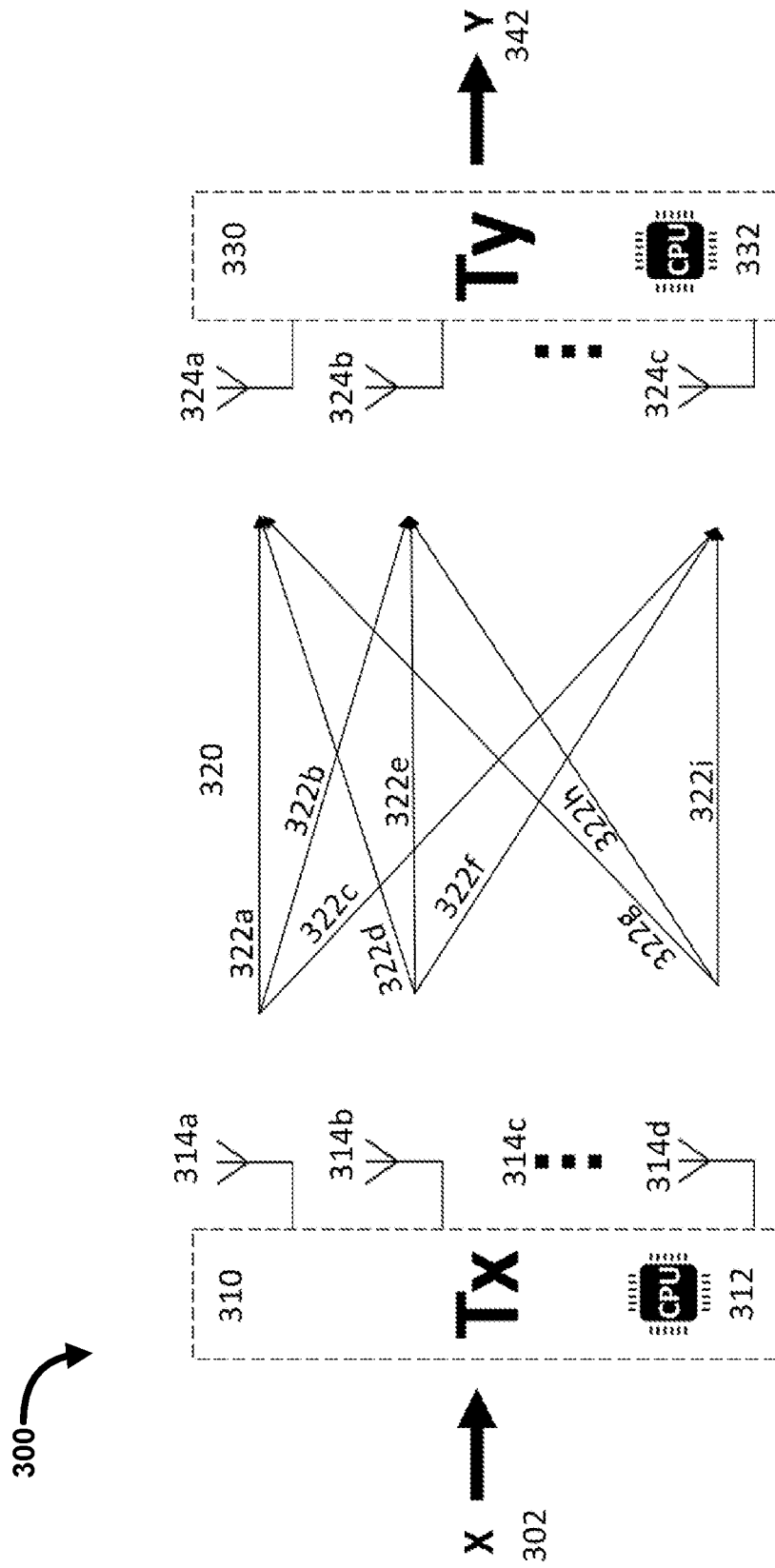
FIG. 3 is a diagram illustrating a system for encoding and decoding a signal, according to an embodiment.

FIG. 3 is a diagram illustrating a system for encoding and decoding a signal (e.g., for implementing the process 200 of FIG. 2), according to an embodiment. The system 300 includes one or more transmitters ("Tx") 310 each including a processor 312 and multiple antennas 314a through 314d. The transmitter 310 is communicatively coupled, via a wireless communications network 320, to one or more receivers ("Ty") 330 each including a processor 332 and multiple antennas 324a through 324c. An input data vector X is received at the system at 302 and is transformed, via a non-linear transformation, into a transformed data vector that is transmitted by the transmitter 310, via one or more of the antennas 314a through 314d the network 320, to the receiver(s) 330. The transformed vector is received at the receiver(s) 330, via one or more of the antennas 324a through 324c, and demodulated based on the non-linear transformation to produce the recovered data vector Y at 342. Each of the antennas 314a through 314d can transmit signals to multiple antennas from the antennas 324a through 324c. In other words, the antennas 314a through 314d of the receiver 310 and the antennas 324a through 324d of the receiver 330 can be configured to perform Multiple Input Multiple Output (MIMO) operations as follows: antenna 314a of transmitter 310 can send signals via the wireless communications network 320 to one of, a subset of, or all of antennas 324a, 324b, and 324c of the receiver 330 (as signals 322a, 322b and 322c, respectively). Similarly, antenna 314b of transmitter 310 can send signals via the wireless communications network 320 to one of, a subset of, or all of antennas 324a, 324b, and 324c of the receiver 330 as signals 322d, 322e and 322f, respectively), and antenna 314c of transmitter 310 can send signals via the wireless communications network 320 to one of, a subset of, or all of antennas 324a, 324b, and 324c of the receiver 330 as signals 322g, 322h and 322i, respectively).

Figure 4:
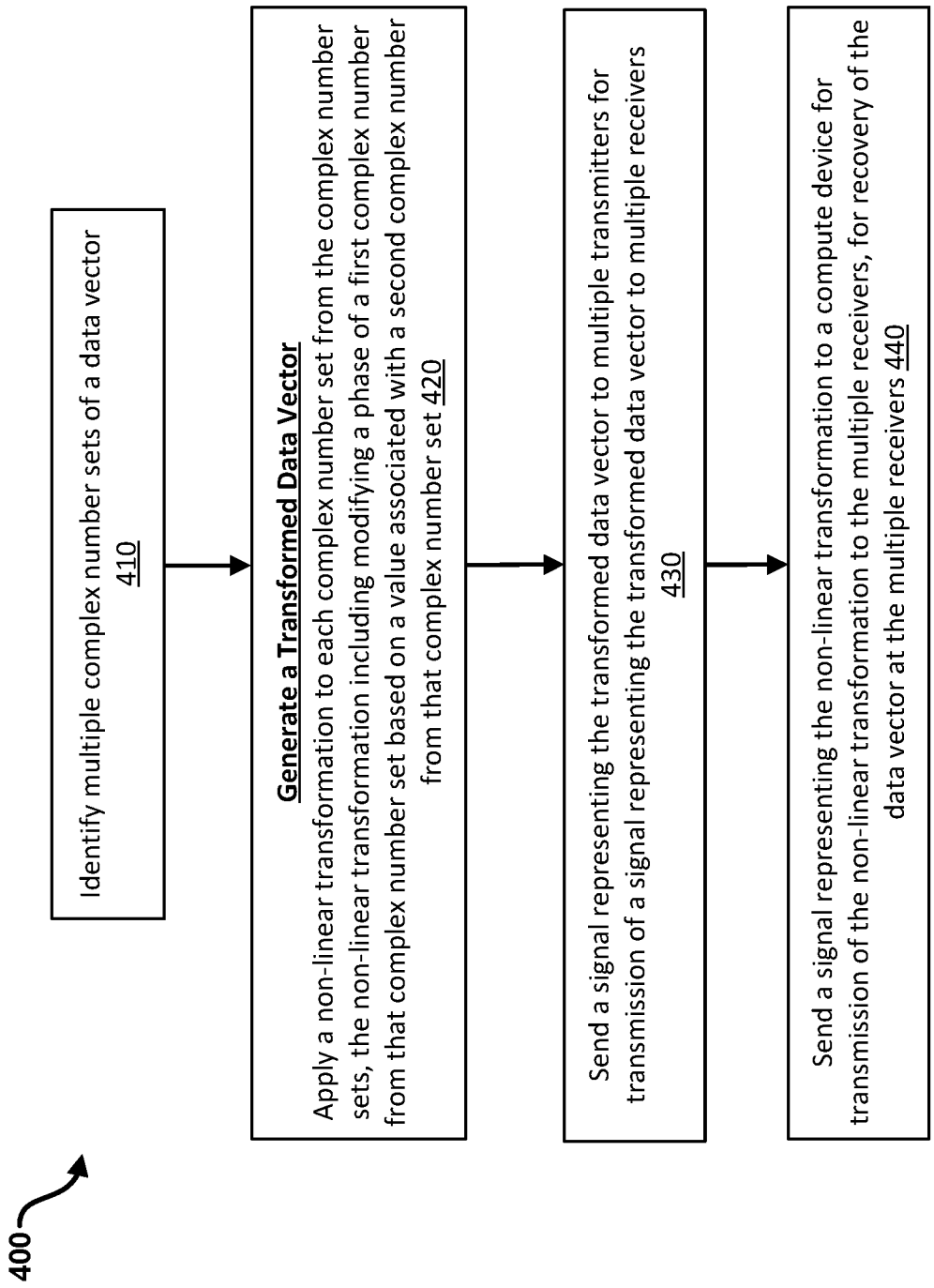
FIG. 4 is a flowchart illustrating an example method for modulating data using a non-linear transformation, according to an embodiment.

FIG. 4 is a flowchart illustrating an example method for modulating data using a non-linear transformation, according to an embodiment. As shown in FIG. 4, the method 400 includes identifying, at 410 and via a processor of a first compute device, multiple complex number sets of an input data vector. The input data vector includes multiple complex numbers. At 420, a transformed data vector is generated by applying, to each subset of complex number sets from the multiple complex number sets, a non-linear transformation. The non-linear transformation includes modifying a phase of a first complex number from that complex number set based on a value associated with a second complex number from that complex number set. A signal representing the transformed data vector is sent, at 830, to multiple transmitters for transmission of a signal representing the transformed data vector from the multiple transmitters to multiple receivers. At 440, a signal representing the non-linear transformation is sent to a second compute device for transmission of the non-linear transformation to the multiple receivers prior to, concurrently with, overlapping in time with, or after transmission of the signal representing the transformed data vector to the multiple receivers, for recovery of the data vector at the plurality of receivers.

In some embodiments, modifying the phase of the first complex number from the complex number set is also based on a predetermined factor, and the method 400 also includes sending a signal representing the predetermined factor to the plurality of receivers prior to, concurrently with, overlapping in time with, or after transmission of the signal representing the transformed data vector from the plurality of transmitters to the plurality of receivers, for recovery of the data vector at the plurality of receivers.

In some embodiments, an input data vector includes multiple complex numbers that are partitioned or broken up into their "norm" (or "magnitude") and phase components. For example, each complex number z can be written as:

$$z = r\, e^{i*x},$$

where r is a positive real number and x is a real number within [0, 2pi).

The multiple complex numbers are partitioned or broken up into complex number sets (e.g., multiple complex number sets are detected or selected), and differences between the two norms of each complex number set are calculated. If r1 is the norm of one of the two complex numbers and r2 is the norm of the other, the difference is calculated as r1−r2 or r2−r1. The difference is then raised to a power p, to obtain an intermediate value (r1−r2)*p or (r2−r1)*p. The intermediate value is then multiplied by a predetermined constant, R, to obtain the value: R*(r1−r2)*p or R*(r2−r1)*p. This value is then used to define an angle by which the phase of the original complex number (z1 or z2) having the smaller norm is rotated/adjusted.

As an example, given a set of complex numbers as follows:

$$z1 = r1 * e^{\{i\,x1\}}$$

$$z2 = r2 * e^{\{i\,x2\}}$$

Assuming that r2<r1, the phase of z2 is adjusted while z1 remains unchanged, as follows:

$$z1 = r1 * e^{\{i\,x1\}}$$

$$z2 = r2 * e^{\{i\,x2\}} * e^{\{iR*(r1-r2)^\wedge p\}}$$

In other words, the complex number having the smaller magnitude is rotated in the complex plane by an angle proportional to a power of the difference between the magnitudes of the complex numbers of the set (i.e., a non-linear transformation). Simulation has shown that for any N (N being the number of subcarriers) and any underlying constellation, there is a value of p and R that render any attempt by an eavesdropper at a linear attack impossible, while having a negligible impact on the BER (at most, less than half a dB of cluster variance for realistic SNRs). A "constellation" (or constellation diagram) is a representation of a signal modulated by a digital modulation scheme.

In some embodiments, the values of R and p vary for each set of symbols in each baud. For example, R may be a function of which "layer" (e.g., in the sense described above, where "layers" are made up of block-U(2)s and permutations, discussed above) and/or a function of which set of symbols is being operated on.

In some embodiments, a non-linear transformation can be performed at any stage of precoding or pre-transmission operations and/or on any collection of sets of complex numbers in the input data vector. For example, the non-linear transformation can be performed one or more of: once at the beginning of precoding or pre-transmission operations, once at the end of precoding or pre-transmission operations, between each block-U(2) and permutation (i.e., after the block-U(2) and before the permutation), etc. The non-linear transformation can be interleaved with any number and combination of other precoding operations, whether linear or non-linear. In some embodiments the non-linear transformation is applied to all complex number sets of an input vector. In other words, each complex number is combined with one other complex number, making a total of N/2 sets. In other embodiments, the non-linear transformation is only applied to a subset of the complex number sets of an input vector and not to other complex number sets of the input vector.

In some embodiments, the non-linear transformation is performed as follows. Take two components of the total (length-N) baud. Both components may be complex numbers, so they can be written as:

$$\begin{pmatrix} z_1 \\ z_2 \end{pmatrix} = \begin{pmatrix} r_1 e^{i\theta_1} \\ r_2 e^{i\theta_2} \end{pmatrix} \quad (20)$$

A single 2-vector is presented above for the sake of discussion, however other vector lengths/sizes can also be used (e.g., single 3-vector, single 4-vector, multiple vectors, etc.). The following operation can be performed on any two components of the vector, and the two components need not necessarily be adjacent to each other. In some implementations, several layers of "fast UBDM" layers of block-U(2)s and permutations are applied first, followed by applying the non-linear transformation to each set of vectors (e.g., adjacent or "side-by-side" sets at this point, since the vector sets been permuted and mixed several times by the layers), followed by one or more additional "fast" layers. Additional examples of fast UBDM layers are described below.

To perform the non-linear transformation on a single set (e.g., pair) of components, two parameters may be selected: a power p (which can be any real number, e.g., 1, 2, or 3) and a value R, which is a real number. Given the two complex numbers, a rotation is applied to the complex number with the smaller magnitude by an angle proportional to the difference between the two absolute values. The smallest rotation will occur when $(r_1 - r_2) = 0$, which results in a rotation of 0. The greatest rotation will occur when $(r_1 - r_2)$ is the maximum possible distance, which will depend on the constellation being used.

For every set of complex numbers as in (20), the difference $(r_1 - r_2)$ is calculated, raised to the power p, then multiplied by R to produce a value that will define the degree of phase rotation applied to the complex number having the smaller magnitude. In other words, the following phase shift is calculated:

$$\phi = R(r_1 - r_2)^p$$

When $r_1 = r_2$, this expression is 0. As $(r_1 - r_2)$ increases, $\phi$ also increases, and the power p controls the rate at which $\phi$ grows. Once $\phi$ has been computed, the complex number with the smaller magnitude is multiplied by $e^{j\phi}$. For example, suppose that in (20) that $r^1 > r^2$. The transformation would be:

$$\begin{pmatrix} r_1 e^{i\theta_1} \\ r_2 e^{i\theta_2} \end{pmatrix} \rightarrow \begin{pmatrix} r_1 e^{i\theta_1} \\ r_2 e^{i(\theta_2 + \phi)} \end{pmatrix}$$

The receiver goes through a similar process, except that once the receiver computes 0, it rotates the complex value with the smaller magnitude in the opposite direction.

Fast Unitary Braid Divisional Multiplexing (UBDM) Transforms

Overview

Consider a basic input including a "baud" vector $\bar{b}$, which is a vector of length N with components in a constellation C. If N=4 and C is a quadrature phase shift keying (QPSK) constellation, an example vector is $\bar{b} = (1+i, -1+i, -1+i, -i)$.

In some embodiments, applying a "fast" UBDM transformation (or "transform") to the example vector is b includes applying a nonlinear part (i.e., a nonlinear "transformation") followed by applying a linear part (i.e., a linear "transformation"). Each of the nonlinear part and the linear part is "keyed" and is implemented using a shared secret between Alice and Bob, the shared secret in the form of a sequence of bits. The nonlinear part includes performing nonlinear operations on the sign bits of one or more input baud vectors, and performing a permutation of the magnitudes. The magnitudes may be permuted without any other change to the magnitudes, during the nonlinear part, for example to preserve the total power of the baud vector. The nonlinear operations on the sign bits can have the effect of imitating a block cipher, and as such, can include all of the nonlinearity of a UBDM transformation. The nonlinear part and the linear part can operate in "layers," as discussed below. The number of layers (denoted L) in each of the nonlinear part and the linear part can vary, depending on the application, and a number of layers associated with nonlinear part can be the same as or different from a number of layers associated with the linear part. For example, in some embodiments the number of linear layers is $L = \lceil \log_2(N) \rceil$, and the number of nonlinear layers (denoted Q) varies depending on the performance constraints and security constraints of the overall communication system, and may have a value of between Q=0 (least secure) and $Q = \lceil \log_2(N) \rceil$ (more secure).

In some embodiments, the linear layers are of the form:

$$\bar{b} \rightarrow PU\bar{b}, \quad (1.1.1)$$

where P is a permutation matrix and U is a direct sum of U(2) matrices.

Nonlinear Operations

In some embodiments, a nonlinear operation (i.e., a nonlinear part of a fast UBDM transform) includes multiple one-time steps and a series of nonlinear and/or linear layers. The multiple one-time steps can include one or more operations from a general class of operations including, by way of example, S-Box applications, diffusive linear transformations (e.g., a Maximum Difference Separable" (MDS) matrix), Xor additions, permutations, etc. In some embodiments, a nonlinear operation (i.e., a nonlinear part of a fast UBDM transform) includes multiple applications of operations typically found in block ciphers (a general class of symmetric cryptologics), including (but not limited to) Substitution-Permutation-Network (SPN) structures, Feistel Structures, Lai-Massey Structures, S-Boxes of any size, key Xor additions, diffusive linear transformations, permutations, addition-rotation-Xor (ARX) operations, etc. These operations can be applied to the complex values themselves, the sign values, the magnitude values, or any combination, so as to vary the amplitudes, frequencies, and phases of the various components of the signal waveform. The input is the baud vector $\bar{b}$ and multiple shared secrets. If the number of nonlinear layers is Q and there are N subcarriers, the shared secret includes Q+1 permutations of length 2N, Q+1 bit strings of length 2N, and a substitution box (an "S-box") of a symmetric key algorithm, on any number of bits (e.g., 4 bits or 8 bits). Optionally, there may also be an initialization vector that is a length 2N bit string. The generation, storage, and transmission of each of these elements is discussed below.

In some embodiments, a nonlinear operation is applied as follows. First, given a baud vector $\bar{b}$ of N complex numbers, the baud vector $\bar{b}$ is partitioned (i.e., broken up or divided) into its 2N (real and imaginary) magnitudes, and its 2N sign bits. For example, if the initial baud vector is from a 16-state quadrature amplitude modulation (16-QAM) constellation and is $\bar{b} = (3-i, 1+i, -1+3i, 1+i)$, the magnitude and sign vectors are:

$$\bar{m} = (3, 1, 1, 1, 1, 3, 1, 1)$$

and $$\bar{s} = (+1, 1, +1, +1, 1, +1, +1, +1).$$

For the magnitude vector $\bar{m}$, a single permutation $P_m$ is applied to the elements (optionally without any other modifications to the magnitude vector $\bar{m}$). Next, for the sign vector $\bar{s}$, the elements are treated/processed as bits and an algorithm resembling a very small block cipher is applied, to produce an intermediate sign vector (or "intermediate vector"). For example, one such implementation is to convert the vector to bits, as follows:

$$\bar{s} = (0, 1, 0, 0, 1, 0, 0, 0).$$

The above modified sign vectors can be referred to as an intermediate sign vector (or "intermediate vector"). A type of modification applied to the sign vector can be selected based on a mode of operation. Examples of modes of operation include, but are not limited to: electronic code book (ECB), cipher block chaining (CBC), counter (CTR), output feedback (OFB), cipher feedback (CFB), etc. ECB is a mode of operation in which a message is divided into blocks of some fixed length, and each block is encrypted separately. CBC is a mode of operation in which a message is divided into blocks of some fixed length, and each block is XORed with the previous cipher text before encrypting. CTR is a mode of operation in which a block cipher is used to encrypt successive values of some "counter," and the output stream of bits is XORed into the data to create the cipher. OFB is a mode of operation in which a block cipher is used to encrypt an initial random value, and the output of the encryption is fed directly into the encryption for the next block. This creates a stream of bits that can be XORed into the plaintext to create the cipher. CFB is a mode of operation in which a block cipher is used to encrypt an initial random value, which is then XORed into the plaintext, creating cipher. This cipher is then fed directly into the encryption for the next block, which is then XORed into the next data block, and so on.

By way of example, in some embodiments, if the mode of operation is a CBC mode, the sign vector is XORed with the length 2N bit vector, the Initialization Vector (IV), that is part of the shared secret. If the mode of operation is an ECB mode, however, the IV may not be applied. Instead, a first step in ECB mode (or a second step in CBC mode) can be to Xor the sign vector with a "seed" vector, which is a length 2N binary vector. This length 2N seed vector can be referred to as bit vector $\bar{k}_0$.

Next, the nonlinear "layers" can be applied, e.g., sequentially from nonlinear layer 1 to nonlinear layer Q. Each nonlinear layer includes an S-Box operation, a permutation $P_q$ (for q∈[1, . . . , Q]), and an additional Xor operation with a fixed binary vector, denoted herein as $\bar{k}_q$. The bit vector $\bar{k}_0$ is referred to as the "seed" and terms $\bar{k}_1, \ldots, \bar{k}_Q$ are referred to as "activators." Applying each nonlinear layer includes applying the permutation $P_q$, followed by an S-Box transformation, either on blocks of 4 bits or on blocks of 8 bits, followed by Xor-ing that layer's $\bar{k}_q$.

In some embodiments, once all of the nonlinear layers have been applied, and if the system is in CBC mode, the resulting sign vector is saved and subsequently used as an initialization vector of a UBDM transformation of a next baud vector that is to be transformed.

Example pseudo-code for a nonlinear transformation in ECB mode is provided below. Given a length N vector of constellation points $\bar{b}$, and shared secrets $P_m$, $\bar{k}_0$, $\bar{k}_q$ for q∈[1, . . . , Q], and $P_q$ for q∈[1, . . . , Q], the input to the algorithm is the baud b of constellation points.

```
m̄ ← (|Re(b₁)|,|Im(b₁)|,|Re(b₂)|,|Im(b₂)|,...,|Re(b_N)|,|Im(b_N)|)
s̄ ← (Sign(Re(b₁)),Sign(Im(b₁)),Sign(Re(b₂)),Sign(Im(b₂)),...,Sign(Re(b_N)),Sign(Im(b_N)))
m̄ ← P_m(m̄)
s̄ ← k̄₀ ⊕ s̄
FOR q = 1 to Q ;
    s̄ ← S(s̄)
    s̄ ← P_q(s̄)
    s̄ ← k̄_q ⊕ s̄
b̄ ← (s₁m₁ + is₂m₂,s₃m₃ + is₄m₄,...,s_{2n-1}m_{2n-1} + is_{2n}m_{2n})
```

The output of the algorithm is the transformed value $\bar{b}$ (also referred to herein as a modified sign vector).

Example pseudo-code for a nonlinear transformation in CBC mode is provided below. Given a length N vector of constellation points $\bar{b}$, and shared secrets $\overline{IV}, P_m, \bar{k}_0, \bar{k}_q$ for q∈[1, . . . , Q], and $P_q$ for q∈[1, . . . , Q], the input to the algorithm is the baud b and the initialization vector $\overline{IV}$.

The output of the algorithm is the transformed value $\bar{b}$ and the new initialization vector $\overline{IV}$, which will be the input to the next baud vector to be transformed.

In some embodiments, when the mode of operation is ECB mode and the algorithm is applied to the same baud vector twice, the same output will be obtained both times. In other embodiments, when the mode of operation is CBC mode, because the initialization vector is used for (and, thus, incorporated into) each transformation, as transformations are performed on successive baud vectors, different outputs may be obtained even if the inputs are the same, thereby providing an additional obstacle for a potential attacker to overcome, and increasing information security.

Once the foregoing nonlinear operations have been completed, the linear/unitary part of the "fast" UBDM transform is performed on the output of the nonlinear operations, as discussed below.

Example Block U(2) Operations

In some embodiments, an action of U is performed on doublets of the vector resulting from previous linear or nonlinear operations. The action of U achieves unitary "mixing" of the components. A single 2×2 block can be of the following form:

$$U_{2\times 2} = e^{i\alpha}\begin{pmatrix} e^{i\psi}\cos(\theta) & e^{i\phi}\sin(\theta) \\ -e^{-i\phi}\sin(\theta) & e^{-i\psi}\cos(\theta) \end{pmatrix}. \quad (1.3.1)$$

A total of N/2 of the 2×2 blocks of (1.3.1) can be included along a diagonal of a single matrix $U_i$, and can include 2N complex numbers (where N is the UBDM block size, and, if the system is OFDM, N can refer to a number of subcarriers). To increase efficiency and speed of data retrieval, in some implementations, only the angles α, φ, θ and ϕ are stored, rather than the entireties of the complex numbers. Each of the foregoing angles can be stored using fewer bits (e.g., at least 8 bits for each angle), as compared to storing the entireties of the complex numbers. As such, only 4·8·(N/2)=16N bits may be needed, for storage purposes, per U. When the time comes to compute the complex floats that are

```
m̄ ← (|Re(b₁)|,|Im(b₁)|,|Re(b₂)|,|Im(b₂)|,...,|Re(b_N)|,|Im(b_N)|)
s̄ ← (Sign(Re(b₁)),Sign(Im(b₁)),Sign(Re(b₂)),Sign(Im(b₂)),...,Sign(Re(b_N)),Sign(Im(b_N)))
m̄ ← P_m(m̄)
s̄ ← ĪV ⊕ s̄
s̄ ← k̄₀ ⊕ s̄
FOR q = 1 to Q ;
    s̄ ← S(s̄)
    s̄ ← P_q(s̄)
    s̄ ← k̄_q ⊕ s̄
b̄ ← (s₁m₁ + is₂m₂,s₃m₃ + is₄m₄,...,s_{2n-1}m_{2n-1} + is_{2n}m_{2n})
ĪV ← s̄
``` actually used in the matrix, if the 8 bit value of, for example, θ, is an integer m (where m is an integer∈[0, $2^m$−1]), then θ can be set to $$\theta = \frac{(2\pi)m}{2^m}$$

radians. Each of the 4 angles (α, φ, θ and φ) can be computed this way, to as many decimal places as is desired.

The action of $U_{2\times2}$ on two components of a baud vector is as follows:

$$\begin{pmatrix} b_1 \\ b_2 \end{pmatrix} \rightarrow \begin{pmatrix} e^{i\alpha}e^{i\psi}\cos(\theta)b_1 + e^{i\alpha}e^{i\phi}\sin(\theta)b_2 \\ -e^{i\alpha}e^{-i\phi}\sin(\theta)b_1 + e^{i\alpha}e^{-i\psi}\cos(\theta)b_2 \end{pmatrix}. \quad (1.3.2)$$

The action of U is as shown above, for each doublet of the components of the vector resulting from the nonlinear operations. The permutations after each U serve to mix/combine as many different components as possible in an unpredictable way.

Example pseudocode for the permutations after each U is as follows. Given the initial vector $\bar{b}$ (output as a result of the nonlinear steps outlined above), as well as a permutation $P_l$ for l∈[1, ..., L], and the collection of block U(2) matrices U, the following is performed:

```
t̄ = b̄
FOR l = 1 to L
    {t̄(P_l(n)),t̄(P_l(n+1))} = U[l][2^c + 1]{b[c], b[c+1]}
b̄ = t̄
```

In the above pseudocode, U represents the collection of all block U(2) matrices for every layer. So, U[l], where l∈[1, ..., L], represents the $l^{th}$ layer block diagonal U(2) matrix. U[l][b], where b∈[1, ..., N/2], represents the $b^{th}$ 2×2 U(2) block along the diagonal of the matrix at layer l. The notation for the permutations assumes that the permutation $P_l$ is in a "list" format. For example, $P_l$=(3,1,4,2) is a permutation on 4 elements, where each value designates a resulting index for that element.

Example Permutation Operations

A variety of different permutations can be used in both the nonlinear part of the fast UBDM transform and linear part of the fast UBDM transform. Example efficient methods for generating and storing such permutations are presented below.

Note that, for N objects, N! unique permutations exist. In other words, if a map is defined from the integers [0, N!), one such integer can be generated at random and then mapped to the corresponding permutation, for example using Lehmer codes. Lehmer codes facilitate the conversion (or mapping) of permutations to integers, and the conversion (or mapping) of integers to permutations, in a fast and efficient manner. An example mapping integers to permutations is discussed below.

Suppose N=4. Given that 4!=24, there are 24 permutations, which can be labeled using the integers 0 ... 23. One of these integers may first be selected at random. Suppose the selected integer is 17. Next, the integer is converted from base-10 to "base factorial," for example as follows:

17÷1=17 remainder 0, (1.4.1)

17÷2=8 remainder 1 (1.4.2)

8÷3=2 remainder 2 (1.4.3)

2÷4=0 remainder 2. (1.4.4)

The conversion terminates when the quotient is 0 (optionally with a remainder). The factorial expression is then obtained using the remainder values, as follows:

2×3!+2×2!+1×1!+0×0!=2×6+2×2+1×1=12+4+1=17. (1.4.5)

Once the factorial representation of the integer has been obtained, which can be written as (2,2,1,0), the following algorithm is performed. The process begins with the rightmost component and moves leftward. At each step, every value to the right of the component in question is increased by 1 if and only if it is equal to or greater than the component in question. For the above example:

(2,2,1,<u>0</u>) nothing to do (2,2,<u>1</u>,0) nothing to do (2,<u>2</u>,1,0) nothing to do (<u>2</u>,2,1,0) increase the second component by 1
   because it is equal to the underlined value (2,3,1,0) (1.4.6)

The last term in the above list, (2,3,1,0), represents the permutation. Each element in the permutation corresponds to a column in P, and the positions within each column of P are positions 0, 1, 2, and 3, in a downward, vertical direction. It indicates that the first element goes to position 2, the second element goes to position 3, the third element goes to position 1, and the last element goes to position 0. The matrix representation of this permutation is:

$$P = \begin{pmatrix} 0 & 0 & 0 & 1 \\ 0 & 0 & 1 & 0 \\ 1 & 0 & 0 & 0 \\ 0 & 1 & 0 & 0 \end{pmatrix} \quad (1.4.7)$$

Consider another example, in which the integer is 8. The factorial representation is:

8÷1=8 remainder 0

8÷2=4 remainder 0

4÷3=1 remainder 1

1÷4=0 remainder 1.

So, indeed:

1×3!+1×2!+0×1!+0×0!=8. (1.4.8)

Next, (1,1,0,<u>0</u>) nothing to do (1,1,<u>0</u>,0) we increase the last 0 by 1

(1,<u>1</u>,0,1) the 0 stays the same, but we increase the last 1 by 1

(<u>1</u>,1,0,2) the second 1 and the 2 both increase by 1

(1,2,0,3). (1.4.9)

This corresponds to the permutation matrix:

$$P = \begin{pmatrix} 0 & 0 & 1 & 0 \\ 1 & 0 & 0 & 0 \\ 0 & 1 & 0 & 0 \\ 0 & 0 & 0 & 1 \end{pmatrix} \quad (1.4.10)$$

In some embodiments, to generate the permutations for a given N, a random integer between 0 and N!−1 is selected and converted to base factorial. The resulting array is then converted to a permutation. A number of bits to accommodate an integer between 0 and N!−1 may be determined, for example, using Sterling's approximation, which in some implementations can provide a slight over-estimate. Then, rather than converting the resulting bit string into an integer followed by converting that integer to its base factorial form, the number of bits for each value can be directly approximated. Note that a general number in base factorial is of the form:

$$x = a_0 \times 0! + a_1 \times 1! + a_2 \times 2! + a_3 \times 3! + \quad (1.4.11)$$

The values $a_n$ are between 0 and n, and represent the numbers of bits to be read for each value. As an example, suppose N=8. The approximate number of bits to be read is thus:

$$\log_2(N!) \approx N \log_2(N) - N = 8 \cdot 3 - 8 = 16. \quad (1.4.12)$$

Next, consider a list of 16 random bits (e.g., using a pseudorandom number generator, such as the PRNG function in Mathematica):

(0,0,1,0,0,0,1,0,1,0,0,1,0,1,1,0)

The first term in the above list of 16 random bits is the coefficient of 0!, which is 0, so that term can be ignored. The second term in the above list of 16 random bits is the coefficient of 1!, which is either 0 or 1. Given that the first bit above (far left in this case), which is 0, $a_1=0$. That first bit is then cut off (removed) from the list of 16 random bits string, leaving the following list of 15 bits:

(0,1,0,0,0,1,0,1,0,0,1,0,1,1,0)

Next, the value $a_2$ is obtained. This value can be 0, 1, or 2, and as such, $a_2$ is represented by 2 bits. Since 2 bits can store more than just 3 possible values, consider taking the value mod 2+1=3. The next two bits (the two far left bits in the above list of 15 bits) are 0 and 1, which have a value (when concatenated, i.e., "01") of 1, so $a_2$ is set to $a_2=1$. Again cutting off (removing) the first 2 bits from the above list of 15 bits leaves the following list of 13 bits:

(0,0,0,1,0,1,0,0,1,0,1,1,0)

Next, for $a_3$, the value can be 0, 1, 2, or 3, and as such, $a_3$ is represented by 2 bits. The first two bits (the two far left bits in the above list of 13 bits) are 0 and 0, which have a value (when concatenated, i.e., "00") of 0, so $a_3$ is set to $a_3=0$. Again cutting off (removing) the first 2 bits from the above list of 13 bits leaves the following list of 11 bits:

(0,1,0,1,0,0,1,0,1,1,0)

Next, for $a_4$, the value can be 0, 1, 2, 3, or 4, and as such, $a_4$ is represented by 3 bits. The next three bits (the three far left bits in the above list of 11 bits) are (0,1,0), which have a value (when concatenated, i.e., "010") of 2, so $a_4$ is set to $a_4=2$. Cutting off (removing) the first 3 bits from the above list of 11 bits leaves the following list of 8 bits:

(1,0,0,1,0,1,1,0)

Next, for $a_5$, there are 6 values, and as such, $a_5$ is represented by 3 bits, which in this example (reading the three far left bits in the above list of 8 bits) are (1,0,0), or 4. So $a_5=4$, and cutting off (removing) the first 3 bits from the above list of 8 bits leaves the following list of 5 bits:

(1,0,1,1,0)

Next, $a_6$ is represented by 3 bits, which in this example (reading the three far left bits in the above list of 5 bits) are (1,0,1), or 5, so $a_6=5$. Cutting off (removing) the first 3 bits from the above list of 5 bits leaves the following 2 bits:

(1,0)

Finally, for $a_7$, there are 8 possibilities, and as such, $a_7$ is represented by 3 bits. Since only 2 bits remain, one additional bit can be generated at random (in this case, 1) and appended to the list to yield:

(1,0,1), and as such, $a_7=5$.

Note that the addition of the extra bit may have been predicted using the following equation:

$$\text{number of bits required for a permutation of size } N = \sum_{n=1}^{N-1} \lceil \log_2(n+1) \rceil. \quad (1.4.13)$$

When N=8, equation 1.4.13 yields a value of 17. The original random bit string with the appended bit (now of length 17) is:

(0,0,1,0,0,0,1,0,1,0,0,1,0,1,1,0,1), which as described above, produces a base factorial number of (5,5,4,2,0,1,0,0). Applying a permutation to the base factorial number yields:

(5,5,4,2,0,1,0̲,0)

(5,5,4,2,0,1̲,0,1)

(5,5,4,2,0̲,1,0,2)

(5,5,4,2̲,0,2,1,3)

(5,5,4̲,2,0,3,1,4)

(5,5̲,4,2,0,3,1,5)

(5̲,5,4,2,0,3,1,6)

(5,6,4,2,0,3,1,7) (1.4.14)

Note that the last (bottom) line is a valid permutation on 8 objects.

In some embodiments, a permutation is inverted, for example as follows. First, the permutation is arranged on a first line and the associated integers are arranged in consecutive order on a second line below the first line. For the above example, the lines appear as follows:

$$\begin{pmatrix} 5 & 6 & 4 & 2 & 0 & 3 & 1 & 7 \\ 0 & 1 & 2 & 3 & 4 & 5 & 6 & 7 \end{pmatrix}. \quad (1.4.15)$$

Next, the columns are rearranged so that the top row is in sequential order, resulting in the following:

$$\begin{pmatrix} 0 & 1 & 2 & 3 & 4 & 5 & 6 & 7 \\ 4 & 6 & 3 & 5 & 2 & 0 & 1 & 7 \end{pmatrix}. \quad (1.4.16)$$

The bottom row in 1.4.16 is the inverse permutation. This result can be verified by inspecting the corresponding matrices. The matrix corresponding to (5,6,4,2,0,3,1,7) (using the convention above) is:

$$\begin{pmatrix} 0 & 0 & 0 & 0 & 1 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 1 & 0 & 0 \\ 0 & 0 & 1 & 0 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 1 \end{pmatrix} \quad (1.4.17)$$

The inverse permutation (4,6,3,5,2,0,1,7) corresponds to the matrix:

$$\begin{pmatrix} 0 & 0 & 0 & 0 & 0 & 1 & 0 & 0 \\ 0 & 0 & 0 & 0 & 0 & 0 & 1 & 0 \\ 0 & 0 & 0 & 0 & 1 & 0 & 0 & 0 \\ 0 & 0 & 1 & 0 & 0 & 0 & 0 & 0 \\ 1 & 0 & 0 & 0 & 0 & 0 & 0 & 0 \\ 0 & 0 & 0 & 1 & 0 & 0 & 0 & 0 \\ 0 & 1 & 0 & 0 & 0 & 0 & 0 & 0 \\ 0 & 0 & 0 & 0 & 0 & 0 & 0 & 1 \end{pmatrix} \quad (1.4.18)$$

It is clear from inspection of 1.4.17 and 1.4.18 that the matrices are inverses of each other (i.e., one is the transpose of the other).

Modification for Peak to Average Power Ratio (PAPR) Reduction

In some embodiments, a modification to the fast UBDM transform is performed, such that the PAPR is reduced. Implementing such a modification can involve one or more slight changes to the algorithm, however the total number of generator bits and their usage can be largely the same. Examples of such changes to the algorithm are outlined below.

PAPR Reduction in the Nonlinear Transformation

In one or more embodiments, a modification to the nonlinear part of the fast UBDM transform is performed when an APSK constellation is used, for example because the non-square shape of an APSK constellation can result in undesirable bulging under UBDM. For example, consider the points a+bi and b+ai, where a>b. In a square constellation, the value a+ai would likely also be a part of the constellation. Circular APSK constellations specifically avoid having such "edge" constellation points. However, when performing a fast UBDM transform as described herein, the permutation of the magnitude transformation in the nonlinear part of the transform can include swapping the points a+ib and b+ia to a+ai and b+bi. The point a+ai will generally have a greater magnitude than either of a+bi or b+ai, and the overall PAPR will have increased as a result.

To avoid or mitigate such effects, a modification can be made to the way the magnitude vector transforms in the nonlinear transformation, as illustrated by the following example.

Consider a case in which N=4. The magnitude permutation is defined by a length 2N=8 permutation. For example, the permutation may be (2,4,1,5,3,8,6,7). The permutation is first separated into two lists of length N: a first list in which each element is less than or equal to N, and a second list in which each element is greater than N, without changing the order of appearance of the elements relative to the permutation. In the current example, the two lists are (2,4,1,3) and (5,8,6,7). Notice that the first of these lists is a valid permutation on N elements. Next, the "top half" (5,8,6,7) is reduced modulo 2, resulting in the following modified second list: (1,0,0,1).

In some embodiments, when performing the nonlinear part of the fast UBDM transform, we use both of these vectors (i.e., the first list and the modified second list) to modify the constellation vector. Suppose the original constellation vector is:

$$\begin{pmatrix} a_1 + ib_1 \\ a_2 + ib_2 \\ a_3 + ib_3 \\ a_4 + ib_4 \end{pmatrix} \quad (1.5.1)$$

The length 2N magnitude vector would then be ($a_1$, $b_1$, $a_2$, $b_2$, $a_3$, $b_3$, $a_4$, $b_4$). Note that the absolute value notation (e.g., the bars in $|a_i|$) are omitted in the above, to avoid cluttering the notation, however the magnitude vector includes the magnitudes of the real and imaginary parts, rather than just the real and imaginary parts. In the fast UBDM transform procedure described above, the length 2N permutation would be applied to the constellation vector. In the PAPR-reduction transformation, however, the following is performed:

First, the magnitude vector is partitioned into blocks of 2, pairing the real and imaginary parts of each number. As such, the magnitude vector becomes the partitioned magnitude vector (($a_1$, $b_1$), ($a_2$, $b_2$), ($a_3$, $b_3$), ($a_4$, $b_4$)). The partitioned magnitude vector is then acted on using a length N permutation produced from the original length 2N permutation. In this case, the length N permutation is (2,4,1,3), so the partitioned magnitude vector becomes a permuted partitioned magnitude vector (($a_2$, $b_2$), ($a_4$, $b_4$), ($a_1$, $b_1$), ($a_3$, $b_3$)). Next, using the binary vector produced from the vector above, the following is obtained: (($b_2$, $a_2$), ($a_4$, $b_4$), ($a_1$, $b_1$), ($b_3$, $a_3$)).

The foregoing is then rearranged into the vector:

$$\begin{pmatrix} b_2 + ia_2 \\ a_4 + ib_4 \\ a_1 + ib_1 \\ b_3 + ia_3 \end{pmatrix} \quad (1.5.2)$$

The signs of each of the numbers in vector 1.5.2 can be determined using a procedure similar to the example nonlinear operations on sign bits during the fast UBDM transform, discussed above. In some embodiments, the foregoing modification to the nonlinear part of the fast UBDM transform is used when a reduction in PAPR is desired and/or an APSK constellation is being used.

PAPR Reduction in the Linear Transformation

In one or more embodiments, a modification to the linear/unitary part of the fast UBDM transform is performed, for example to restrict the values of 0 in the baud vector (1.3.2). In the Block U(2) Operations section above, the angle bits were used to select an angle from a uniform distribution on [0, 2π]. To reduce PAPR, the value of this angle may be scaled to be close to 0, for example by selecting a value r∈(0,1]. The closer the value r is to 1, the greater the PAPR will be. If r=0, the PAPR will be identical to the original PAPR, particularly if the constellation was QAM. If the constellation is APSK, a modification to the nonlinear part of the fast UBDM transform, described in the previous section, may also be performed. In some embodiments, a value of r=0.01 is desirable. Values outside of the interval [0,1] can also be acceptable.

Once a value of r has been selected, the value Θ that was chosen by the generator bits is changed to:

$$\theta \to \theta' = \frac{r}{4}(\theta - \pi). \quad (1.5.3)$$

θ' can then be used in the block U(2) transformations. The foregoing changes can be implemented without modifying the generator bits that are produced. In other words, the same generator bits can be used, but the θ values are scaled in each of the U(2) blocks.

MEM Diffusion

In some embodiments, a "MEM" operation is performed during the nonlinear part of the fast UBDM transform. The MEM operation includes taking the sign vector $\bar{s}$, treating it as a binary vector (e.g. $\bar{s}$=(1,1,0,1,1,1,0,0), rather than (−1,−1,1,−1,−1,1,1)), and flipping each bit if and only if the Hamming weight of the vector is even. The Hamming weight or a string is the number of symbols that are different from the zero-symbol of the alphabet being used. A few examples are as follows:

(1,1,0,1,1,1,0,0)⇒(1,1,0,1,1,1,0,0)

(1,1,0,1,1,1,0,1)⇒(0,0,1,0,0,0,1,0)

(0,1,0,1,1,1,1,0)⇒(1,0,1,0,0,0,0,0)

(0,1,0,1,0,1,0,0)⇒(0,1,0,1,0,1,0,0)

Alternatively, if the sign vector is represented in terms of {±1}, the operation can be as follows:

$$\bar{s} \to (-1)^{\#[\bar{s},-1]}\bar{s}, \quad (1.6.1)$$

where #[$\bar{a}$,b] returns a number of occurrences of b in $\bar{a}$. The MEM operation can be used, for example, to quickly and efficiently maximize diffusion.

Nonlinear Transformation Example

The following is an example implementation of a nonlinear part of a fast UBDM transform, in accordance with one or more embodiments. Consider a 16 QAM block:

$$(3-i,-1+i,-3-3i,1+3i). \quad (0.-1.1)$$

As can be observed in (0.-1.1), in this example the block size is N=4.

First, the block is partitioned or broken up into two separate length 2N vectors—a first vector capturing the magnitudes of the real and imaginary parts, and a second vector capturing the signs of the real and imaginary parts. In this example, these first and second vectors are:

$$\bar{m}=(3,1,1,1,3,3,1,3),$$

$$\bar{s}=(1,-1,-1,1,-1,-1,1,1), \quad (0.-1.2)$$

For the magnitude vector, a permutation is applied, the permutation depending on the generator bits/key values. For example, the permutation, "π," may be:

$$\pi=(6,2,4,1,8,3,7,5). \quad (0.-1.3)$$

Applying the permutation (0.-1.3) to the magnitude vector produces the following new magnitude vector:

$$\bar{m} \to \pi(\bar{m})=(3,1,1,3,3,1,3), \quad (0.-1.4)$$

Note that the value originally in the $6^{th}$ place in $\bar{m}$ has moved to the $1^{st}$ place, the value originally in the second place has remained in the second place, the value in the $4^{th}$ place has moved to the $3^{rd}$ place, etc.

Next, a block cipher is applied to the sign bits. For example, the sign values can be converted into bits as follows:

$$(1,-1,-1,1,-1,1,1) \to (0,1,1,0,1,1,0,0). \quad (0.-1.5)$$

A "Substitution-Permutation-Network" (SPN) cipher is used for this example, however other types of block ciphers would also work (e.g., Feistel ciphers, Lai-Massey ciphers, etc).

The sign bits of (0.-1.5) are Xor'ed with a generator/seed value. For example, the seed value may be (1,0,0,1,1,1,1,0). The output of the Xor operation is:

$$(0,1,1,0,1,1,0,0) \oplus (1,0,0,1,1,1,1,0)=(1,1,1,1,0,0,1,0). \quad (0.-1.6)$$

Next, a "substitution box", or "s-box," is applied. Applying the s-box includes replacing a collection of bits of a predefined block size with other bits of the same block size. For the current example, consider a 4-bit s-box, defined by the following lookup table:

(0,0,0,0)→(0,0,0,0)(1,0,0,0)→(1,0,0,0)

(0,0,0,1)→(0,0,0,1)(1,0,0,1)→(1,0,1,1)

(0,0,1,0)→(0,0,1,0)(1,0,1,0)→(1,1,0,0)

(0,0,1,1)→(1,1,0,1)(1,0,1,1)→(1,0,0,1)

(0,1,0,0)→(0,1,1,1)(1,1,0,0)→(0,0,1,1)

(0,1,0,1)→(0,1,1,1)(1,1,0,1)→(1,1,1,0)

(0,1,1,0)→(1,1,1,1)(1,1,1,0)→(1,0,1,0)

(0,1,1,1)→(0,1,1,0)(1,1,1,1)→(0,1,0,1) (0.-1.7)

To apply this s-box, the bit string (1, 1, 1, 1, 0, 0, 1, 0) of (0.-1.6) is broken into blocks of four bits each. These blocks are (1, 1, 1, 1) and (0, 0, 1, 0). Using the s-box, it can be observed that: (1, 1, 1, 1)→(0, 1, 0, 1) and (0, 0, 1, 0)→(0, 0, 1, 0).

So, the bit string is now:

$$(0,1,0,1,0,0,1,0) \quad (0.-1.8)$$

Next, a permutation is applied to the bit string. For the current example, the permutation π=(1, 3, 5, 7, 2, 4, 6, 8) is used, and the bit string becomes:

$$\pi(0,1,0,1,0,0,1,0)=(0,0,0,1,1,1,0,0) \quad (0.-1.9)$$

The foregoing process is then repeated, by Xor'ing another 8-bit string, applying the s-box, then applying a permutation, and so on. In the end, a final 8-bit string is obtained, which is converted back into signs, for example as follows (note that the following does not reflect any repetition of the transformation):

$$(0,0,0,1,1,1,0,0) \to (1,1,1,-1,-1,-1,1,1) \quad (0.-1.10)$$

The vector (0.-1.10) is then combined with the permuted magnitude vector $\overline{m}$, and the length N complex vector is reassembled:

$$(3+i, i-3i, -3i-i, 1+3i). \qquad (0.-1.11)$$

The vector (0.-1.11) is a vector of constellation points that is subsequently passed to the linear/unitary part (layers/rounds) of the fast UBDM transform.

The repetitions described above (Xor→s-box→permutation) can be referred to as "rounds" or "layers." The Xor values can be referred to as "round keys," "seeds," or "activators." In some embodiments, the same s-box is applied in each layer from multiple layers. In other embodiments, a different s-box is applied in each layer from multiple layers. In still other embodiments, two or more different s-boxes can be used within multiple layers. The permutations can be the same every round/layer or they can be different every time. Similarly, in some embodiments, the same permutation is used in each layer from multiple layers. In other embodiments, a different permutation is used in each layer from multiple layers. In still other embodiments, two or more different permutations are used within multiple layers.

Each of the number of layers/rounds, the actual value of the Xor values (seeds/generators), and the value of the s-box, can be variable and/or predefined. Whether or not each of the number of layers/rounds, the actual value of the Xor values (seeds/generators), and the value of the s-box are keyed or fixed can be variable and/or predefined. Although in the above example, the block size was N=4, and therefore the length of $\overline{m}$ and $\overline{s}$ was 8, the size of the block can be variable and/or predefined. Although in the above example, the size of the s-box was 4, the size of the s-box can be variable and/or predefined, and can be any size of a variety of sizes (e.g., 8). Notwithstanding the examples provided above, the order and manner in which the permutations, s-boxes, additions, etc. are stacked/implemented can be variable and/or predefined.

Figure 5:
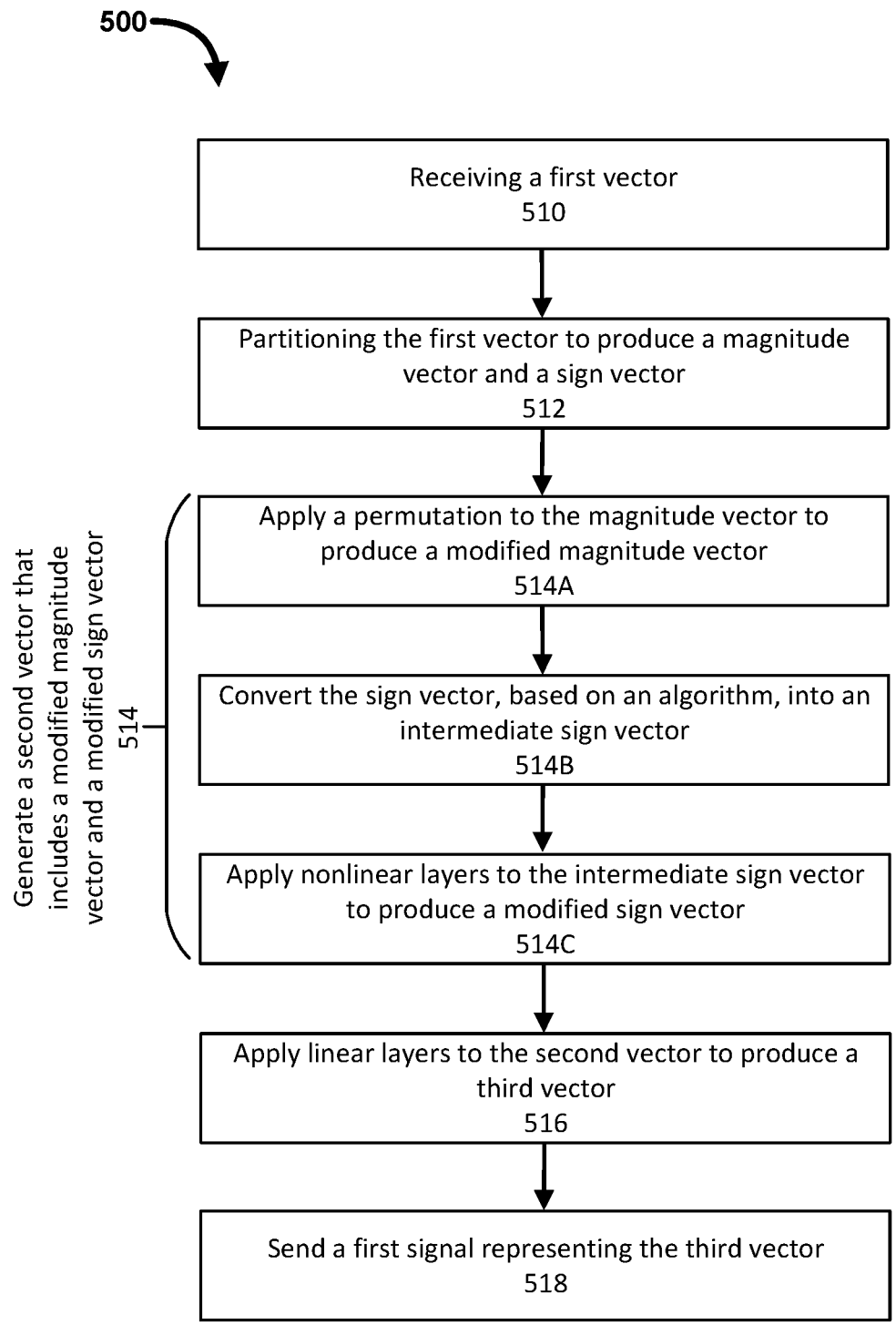
FIG. 5 is a flowchart illustrating an example method for implementing a fast UBDM transform, according to an embodiment.

FIG. 5 is a flowchart illustrating an example method 500 for implementing a fast UBDM transform, according to an embodiment. As shown in FIG. 5, the method 500 includes receiving a first vector via a processor, at 510, and partitioning the first vector at 512 to produce a magnitude vector and a sign vector. A second vector, including a modified magnitude vector and a modified sign vector, is generated at 514 by: applying, at 514A, a permutation to the magnitude vector to produce the modified magnitude vector; converting the sign vector, at 514B, based on an algorithm, into an intermediate sign vector; and applying, at 514C, a plurality of nonlinear layers to the intermediate sign vector, to produce the modified sign vector. The converting the sign vector at 514B is optionally based on an initialization vector. Each nonlinear layer from the plurality of nonlinear layers includes at least one of, or any combination of, a permutation, an S-box transformation, a diffusive linear operation, or an Xor operation, as discussed herein. A plurality of linear layers is applied to the second vector, at 516, to produce a third vector, the third vector being a transformed version of the first vector. A first signal representing the third vector is sent, at 518, for example to at least one transmitter for transmission of a second signal representing the transformed data vector from the at least one transmitter to at least one receiver. In some implementations, the permutation applied to the magnitude vector does not reduce a total power of the first vector.

In some embodiments, the method 500 also includes selecting the algorithm based on an encryption mode of operation of the processor. The algorithm can include an Xor operation, and an encryption mode of operation of the processor can be a cipher block chaining (CBC) mode or an electronic code book (ECB) mode. A number of nonlinear layers in the plurality of nonlinear layers can be the same as, or different from, a number of linear layers in the plurality of linear layers.

In some embodiments, at least one of a number of linear layers ("L") in the plurality of linear layers or a number of nonlinear layers ("Q") in the plurality of nonlinear layers is equal to $[\log_2(N)]$.

In some embodiments, at least one of a number of nonlinear layers in the plurality of nonlinear layers or a number of linear layers in the plurality of linear layers is based on a performance constraint and/or a security constraint (e.g., of a given communications system or component thereof).

Figure 6:
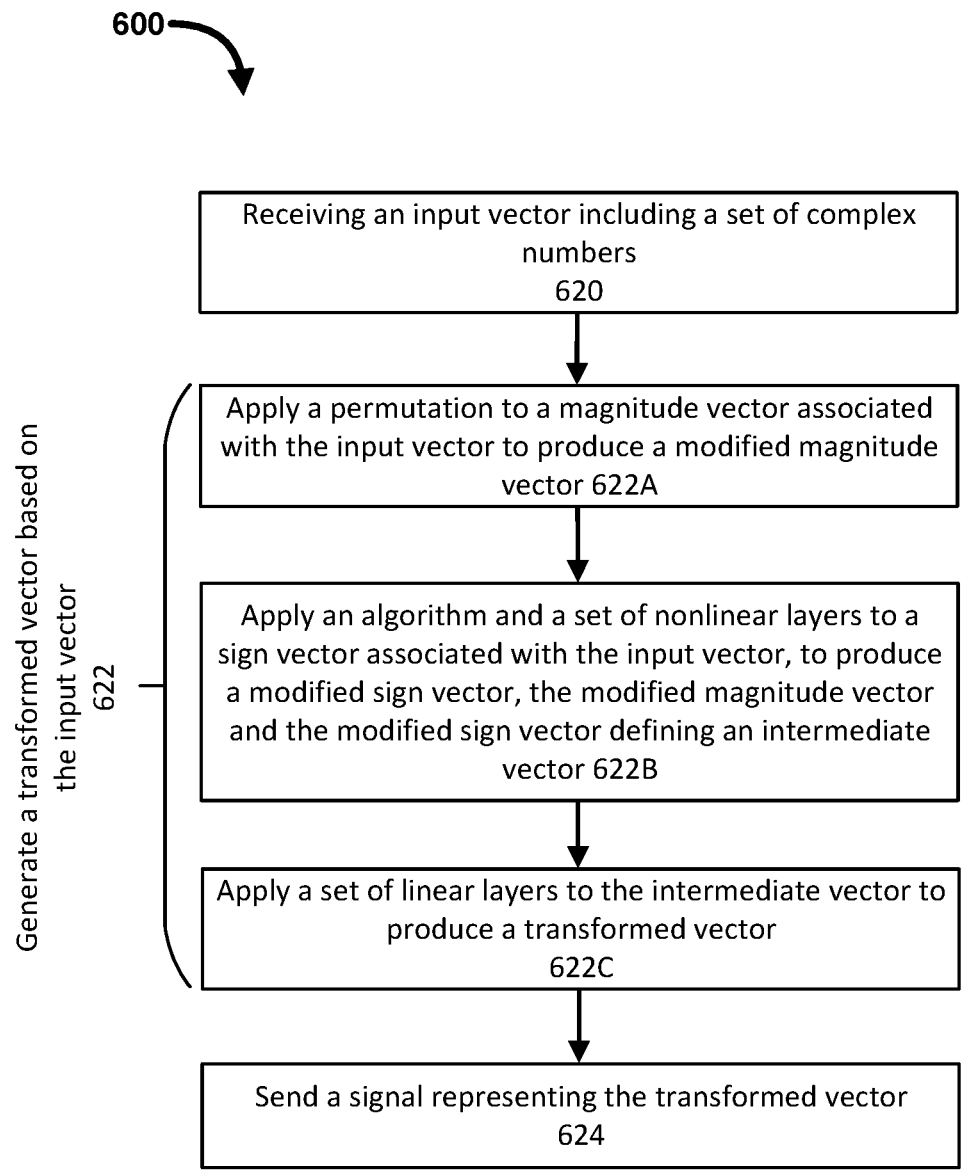
FIG. 6 is a flowchart illustrating an example method for implementing a fast UBDM transform, according to an embodiment.

FIG. 6 is a flowchart illustrating an example method 600 for implementing a fast UBDM transform, according to an embodiment. As shown in FIG. 6, the method 600 includes receiving, via a processor, an input vector, at 620, the input vector including a plurality of complex numbers. A transformed vector is generated, at 622, based on the input vector and via the processor, by: applying a permutation, at 622A, to a magnitude vector associated with the input vector, to produce a modified magnitude vector; applying an algorithm at 622B (e.g., including an Xor operation) and a plurality of nonlinear layers to a sign vector associated with the input vector, to produce a modified sign vector, the modified magnitude vector and the modified sign vector defining an intermediate vector; and applying, at 622C, a plurality of linear layers to the intermediate vector to produce the transformed vector. The method 600 also includes sending a signal representing the transformed vector, at 624, e.g., to at least one transmitter for transmission of a second signal representing the transformed vector from the at least one transmitter to at least one receiver. In some implementations, the permutation applied to the magnitude vector does not reduce a total power of the input vector.

In some embodiments, each nonlinear layer from the plurality of nonlinear layers includes at least one of: a permutation, an S-box transformation, a diffusive linear operation, or an Xor operation. The method 600 can also include selecting the algorithm based on an encryption mode of operation of the processor (e.g., a cipher block chaining (CBC) mode or an electronic code book (ECB) mode).

A number of nonlinear layers in the plurality of nonlinear layers can be the same as, or different from, a number of linear layers in the plurality of linear layers. At least one of a number of nonlinear layers in the plurality of nonlinear layers or a number of linear layers in the plurality of linear layers can be based on at least one of a performance constraint or a security constraint.

In some embodiments, at least one of a number of linear layers ("L") in the plurality of linear layers or a number of nonlinear layers ("Q") in the plurality of nonlinear layers is equal to $[\log_2(N)]$.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, and solid state storage devices; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. A method, comprising:
receiving, via a processor, a first vector;
partitioning the first vector, via the processor, to produce a magnitude vector and a sign vector;
generating a second vector, via the processor, including a modified magnitude vector and a modified sign vector, by:
applying a permutation to the magnitude vector to produce the modified magnitude vector,
converting the sign vector, based on an algorithm, into an intermediate sign vector, and
applying a plurality of nonlinear layers to the intermediate sign vector, each nonlinear layer from the plurality of nonlinear layers including at least one of a permutation, an S-box transformation, a diffusive linear operation, or an Xor operation, to produce the modified sign vector;
applying, via the processor, a plurality of linear layers to the second vector to produce a third vector, the third vector being a transformed version of the first vector; and
sending a first signal representing the third vector to at least one transmitter for transmission of a second signal representing the transformed data vector from the at least one transmitter to at least one receiver.

2. The method of claim 1, wherein the converting the sign vector is based on an initialization vector.

3. The method of claim 1, further comprising selecting the algorithm based on an encryption mode of operation of the processor.

4. The method of claim 1, wherein the algorithm includes an Xor operation, and an encryption mode of operation of the processor is a cipher block chaining (CBC) mode.

5. The method of claim 1, wherein the algorithm includes an Xor operation, and an encryption mode of operation of the processor is an electronic code book (ECB) mode.

6. The method of claim 1, wherein a number of nonlinear layers in the plurality of nonlinear layers equals a number of linear layers in the plurality of linear layers.

7. The method of claim 1, wherein a number of nonlinear layers in the plurality of nonlinear layers is different from a number of linear layers in the plurality of linear layers.

8. The method of claim 1, wherein at least one of a number of linear layers ("L") in the plurality of linear layers or a number of nonlinear layers ("Q") in the plurality of nonlinear layers is equal to $[\log_2(N)]$.

9. The method of claim 1, wherein at least one of a number of nonlinear layers in the plurality of nonlinear layers or a number of linear layers in the plurality of linear layers is based on a performance constraint.

10. The method of claim 1, wherein at least one of a number of nonlinear layers in the plurality of nonlinear layers or a number of linear layers in the plurality of linear layers is based on a security constraint.

11. The method of claim 1, wherein the permutation applied to the magnitude vector does not reduce a total power of the first vector.

12. A method, comprising: receiving, via a processor, an input vector including a plurality of complex numbers; generating a transformed vector based on the input vector, via the processor, by: applying a permutation to a magnitude vector associated with the input vector, to produce a modified magnitude vector, applying an algorithm and a plurality of nonlinear layers to a sign vector associated with the input vector, to produce a modified sign vector, the modified magnitude vector and the modified sign vector defining an intermediate vector, each nonlinear layer from the plurality of nonlinear layers including at least one of: a permutation, an S-box transformation, a diffusive linear operation, or an XOR operation, and applying a plurality of linear layers to the intermediate vector to produce the transformed vector; and sending a first signal representing the transformed vector to at least one transmitter.

13. The method of claim 12, further comprising selecting the algorithm based on an encryption mode of operation of the processor.

14. The method of claim 12, wherein the algorithm includes an Xor operation, and an encryption mode of operation of the processor is one of a cipher block chaining (CBC) mode or an electronic code book (ECB) mode.

15. The method of claim 12, wherein a number of nonlinear layers in the plurality of nonlinear layers equals a number of linear layers in the plurality of linear layers.

16. The method of claim 12, wherein a number of nonlinear layers in the plurality of nonlinear layers is different from a number of linear layers in the plurality of linear layers.

17. The method of claim 12, wherein at least one of a number of linear layers ("L") in the plurality of linear layers or a number of nonlinear layers ("Q") in the plurality of nonlinear layers is equal to $[\log_2(N)]$.

18. The method of claim 12, wherein at least one of a number of nonlinear layers in the plurality of nonlinear layers or a number of linear layers in the plurality of linear layers is based on at least one of a performance constraint or a security constraint.

19. The method of claim 12, wherein the permutation applied to the magnitude vector does not reduce a total power of the first vector.

* * * * *